US012776095B2

(12) United States Patent
Zheng

(10) Patent No.: US 12,776,095 B2
(45) Date of Patent: Oct. 27, 2026

(54) VIDEO COMMENT DISPLAY METHOD AND APPARATUS, TERMINAL, AND STORAGE MEDIUM

(71) Applicant: Tencent Technology (Shenzhen) Company Limited, Shenzhen (CN)

(72) Inventor: Shangzhen Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 77 days.

(21) Appl. No.: 18/773,394

(22) Filed: Jul. 15, 2024

(65) Prior Publication Data

US 2024/0371083 A1 Nov. 7, 2024

Related U.S. Application Data

(63) Continuation of application No. PCT/CN2023/117334, filed on Sep. 6, 2023.

(30) Foreign Application Priority Data

Oct. 12, 2022 (CN) ......................... 202211248945.6

(51) Int. Cl.
*G06T 15/20* (2011.01)
*H04N 21/431* (2011.01)
(Continued)

(52) U.S. Cl.
CPC ....... *G06T 15/205* (2013.01); *H04N 21/4316* (2013.01); *H04N 21/4788* (2013.01); (Continued)

(58) Field of Classification Search
None
See application file for complete search history.

(56) References Cited

U.S. PATENT DOCUMENTS

2010/0115426 A1* 5/2010 Liu ...................... G06Q 10/107 715/757
2011/0093897 A1* 4/2011 Gerba ................ H04N 21/4722 725/42
(Continued)

FOREIGN PATENT DOCUMENTS

CN 104185079 A 12/2014
CN 105916001 A 8/2016
(Continued)

OTHER PUBLICATIONS

Tencent Technology, ISR, PCT/CN2023/117334, Dec. 4, 2023, 3 pgs.

*Primary Examiner* — Anh-Tuan V Nguyen
(74) *Attorney, Agent, or Firm* — Morgan, Lewis & Bockius LLP

(57) ABSTRACT

Embodiments of this application disclose a video comment display method performed by a computer device. The method includes: displaying a video playing interface, the video playing interface comprising a video playing region and a video comment region, and the video comment region being configured for displaying comments for a video in the video playing region; obtaining a comment issued by an audience account associated with the computer device; determining a comment display attribute of the comment based on spatial coordinates representing a spatial position of a 3D virtual watching scene at which the comment is posted, the comment display attribute comprising a display position corresponding to the spatial position of the comment in the 3D virtual watching scene in the video comment region; and displaying the comment at the display position in the video comment region.

18 Claims, 11 Drawing Sheets

(51) Int. Cl.
*H04N 21/4788* (2011.01)
*G06F 3/01* (2006.01)

(52) U.S. Cl.
CPC .......... *G06F 3/013* (2013.01); *G06T 2200/24* (2013.01); *G06T 2210/62* (2013.01)

(56) References Cited

U.S. PATENT DOCUMENTS

| | | | | |
|---|---|---|---|---|
| 2014/0013200 | A1* | 1/2014 | White | H04N 21/235<br>715/230 |
| 2015/0020003 | A1 | 1/2015 | Karam | |
| 2019/0102941 | A1* | 4/2019 | Khan | A63F 13/86 |
| 2020/0336718 | A1* | 10/2020 | Yoon | G06F 40/169 |
| 2021/0385554 | A1* | 12/2021 | Takahashi | H04N 21/4728 |
| 2023/0224445 | A1* | 7/2023 | Aoki | H04N 21/258<br>345/427 |

FOREIGN PATENT DOCUMENTS

| | | | |
|---|---|---|---|
| CN | 106210861 | A | 12/2016 |
| CN | 108039996 | A | 5/2018 |
| CN | 111901658 | A | 11/2020 |
| CN | 112702643 | A | 4/2021 |
| CN | 114501104 | A | 5/2022 |
| KR | 20210143507 | A | 11/2021 |

* cited by examiner

VIDEO COMMENT DISPLAY METHOD AND APPARATUS, TERMINAL, AND STORAGE MEDIUM

CROSS-REFERENCE TO RELATED APPLICATIONS

This application is a continuation application of PCT Patent Application No. PCT/CN2023/117334, entitled "VIDEO COMMENT DISPLAY METHOD AND APPARATUS, TERMINAL, AND STORAGE MEDIUM" filed on Sep. 6, 2023, which claims priority to Chinese Patent Application No. 202211248945.6, entitled "VIDEO COMMENT DISPLAY METHOD AND APPARATUS, TERMINAL, AND STORAGE MEDIUM" and filed on Oct. 12, 2022, both of which are incorporated herein by reference in their entirety.

FIELD OF THE TECHNOLOGY

Embodiments of this application relate to the field of human-machine interaction technologies, and in particular, to a video comment display method and apparatus, a terminal, and a storage medium.

BACKGROUND OF THE DISCLOSURE

During a video playing process, a user can perform video watching interaction by issuing a comment.

In the related art, comment content is generally displayed on a video playing interface in a 2D streaming display manner, and is usually displayed in an up-down scrolling manner or a left-right moving manner. However, for a video of a performance type, such a comment display manner cannot simulate the spatial feeling of a real site, leading to a lack of a three-dimensional sense of users at different positions during a watching process, and reducing video watching experience of the user.

SUMMARY

Embodiments of this application provide a video comment display method and apparatus, a terminal, and a storage medium. Technical solutions are as follows:

According to an aspect, an embodiment of this application provides a video comment display method, performed by a computer device, the method including:

- displaying a video playing interface, the video playing interface comprising a video playing region and a video comment region, and the video comment region being configured for displaying comments for a video in the video playing region;
- obtaining a comment issued by an audience account associated with the computer device;
- determining a comment display attribute of the comment based on spatial coordinates representing a spatial position of a 3D virtual watching scene at which the comment is posted, the comment display attribute comprising a display position corresponding to the spatial position of the comment in the 3D virtual watching scene in the video comment region; and
- displaying the comment at the display position in the video comment region.

According to another aspect, an embodiment of this application provides a computer device that includes a processor and a memory, the memory stores at least one instruction, and the at least one instruction, when loaded and executed by the processor, causes the computer device to implement the video comment display method described in the foregoing aspects.

According to another aspect, an embodiment of this application provides a non-transitory computer-readable storage medium. The readable storage medium stores at least one instruction, and the at least one instruction, when loaded and executed by a processor, causes the computer device to implement the video comment display method described in the foregoing aspects.

In the embodiments of this application, the terminal displays the video and the video comment in the video playing interface in different regions, and divides the video playing interface into the video playing region and the video comment region. In addition, to simulate the three-dimensional sense of users located at different positions watching performance in a real watching scene, the terminal transmits the comment issued by the audience account to the server, and the server performs spatial position allocation on the audience account, so that the terminal obtains the comment issued by the audience account and the spatial coordinates corresponding to the audience account from the server, where the spatial coordinates indicate the spatial position at which the audience account is located in the virtual watching scene corresponding to the video. Further, the terminal determines the comment display attribute of the comment in the video comment region based on the spatial coordinates, and displays the comment at the corresponding display position based on the display effect corresponding to the comment, thereby improving the three-dimensional sense of comment displaying in the video comment region and improving the diversity of the display effect of the comment.

In addition, by using the solutions provided in the embodiments of this application, various comments issued by the same audience account are displayed at a uniform display position, so that a user can quickly position an issuing frequency of the user or another specific user, thereby improving a significance degree of comment content and the comment viewing efficiency. Therefore, the video comment region has a function of enabling an audience to communicate with another audience in real time by issuing a comment when watching a video.

DESCRIPTION OF EMBODIMENTS

To make the objectives, technical solutions, and advantages of this application clearer, the following further describes the implementations of this application in detail with reference to the accompanying drawings.

Figure 1:
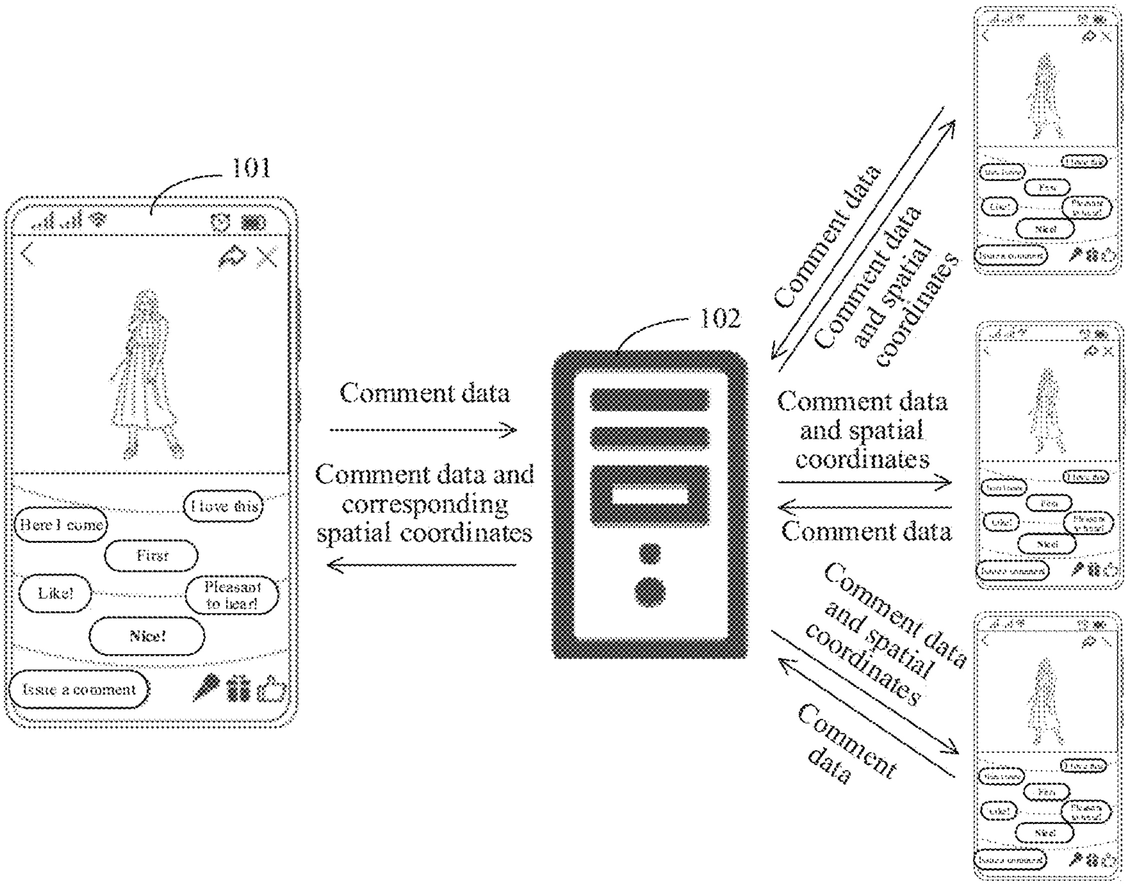
FIG. 1 is a schematic diagram of an implementation environment according to an exemplary embodiment of this application.

FIG. 1 is a schematic diagram of an implementation environment according to an exemplary embodiment of this application. The implementation environment includes a terminal 101 and a server 102. The terminal 101 performs data communication with the server 102 through a communication network. In some embodiments, the communication network may be a wired network or a wireless network, and the communication network may be at least one of a local area network, a metropolitan area network, or a wide area network.

The terminal 101 is an electronic device on which an application program having a video playing function is installed. The video playing function may be a function of a native application in the terminal or a function of a third-party application, and the application program may be a live streaming application, a shopping application having a video playing function, a short video application, or a social application having a video playing function. This is not limited in this embodiment. The electronic device may be a smartphone, a tablet computer, a personal computer, a wearable device, or an in-vehicle terminal. In FIG. 1, an example in which the terminal 101 is a smartphone is used for description, but this application is not limited thereto.

The server 102 may be an independent physical server, or may be a server cluster including a plurality of physical servers or a distributed system, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. In the embodiments of this application, the server 102 may be a backend server of an application having a video playing function.

In a possible scenario, as shown in FIG. 1, data exchange exists between the server 102 and the terminal 101. When that the terminal 101 receives a video comment issued by an audience, the terminal 101 transmits comment data to the server 102, the server 102 performs spatial coordinate allocation on an audience account included in the comment data, and the server 102 delivers the comment data and spatial coordinates corresponding to the comment data to the terminal 101 and another terminal currently using a video comment display function.

A virtual watching scene involved in the embodiments of this application may be a concert, a movie, an award ceremony, or the like. When that the terminal plays a concert, movie, or award ceremony video (live or non-live), in response to a comment issuing operation, the terminal transmits a comment issued by an audience account to the server, and the server performs spatial position allocation on the audience account according to spatial positions in the virtual watching scene.

For example, when that the virtual watching scene simulates a concert venue, the server performs spatial coordinate allocation on the audience account according to spatial position distribution of the concert venue, to simulate an effect that an audience watches a concert on site in a real scene. When that the virtual watching scene simulates a cinema playing hall, the server performs spatial coordinate allocation on the audience account according to spatial position distribution of the cinema playing hall, to simulate an effect that an audience watches a movie in a cinema in a real scene. When that the virtual watching scene simulates an award ceremony, the server performs spatial coordinate allocation on the audience account according to spatial position distribution of an award ceremony venue, to simulate an effect that an audience is at the award ceremony in a real scene.

Figure 2:
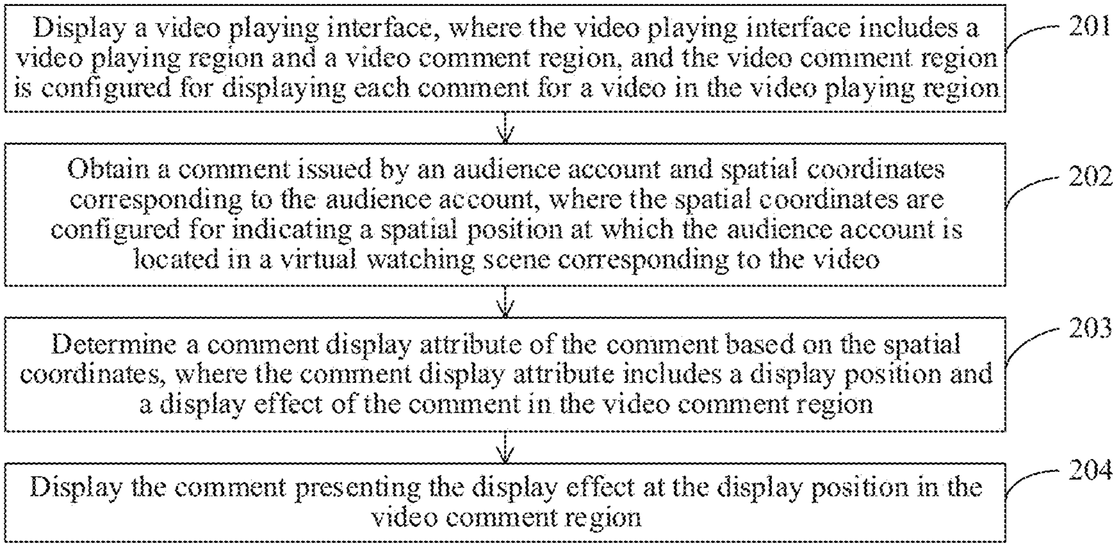
FIG. 2 is a flowchart of a video comment display method according to an exemplary embodiment of this application.

FIG. 2 is a flowchart of a video comment display method according to an exemplary embodiment of this application. This embodiment is described by using an example in which the method is applied to the terminal in FIG. 1, and the method includes the following operations:

Operation 201. Display a video playing interface, where the video playing interface includes a video playing region and a video comment region, and the video comment region is configured for displaying each comment for a video in the video playing region.

In a possible implementation, after receiving a trigger operation of entering the video playing interface, the terminal displays the video playing interface, and an audience can perform interaction by issuing a comment for a video in the video playing interface in a process of watching the video.

In a possible implementation, to improve a playing effect of the video, the terminal sets the video playing region and the video comment region in the video playing interface respectively, and displays the video playing region and the video comment region separately, where the video comment region is configured for displaying the comment of the audience for the video in the video playing region. In some embodiments, the video playing region and the video comment region may be displayed respectively in an upper half part and a lower half part, or may be displayed respectively in a left half part and a right half part, or may be displayed in a surrounding manner (for example, the video comment region surrounds the video playing region), and a specific display manner is not limited in the embodiments of this application.

In some embodiments, the video played in the video playing region may be a video in a live streaming form, or may be a recorded video, or may be a video in another form, which is not limited in the embodiments of this application.

Figure 3:
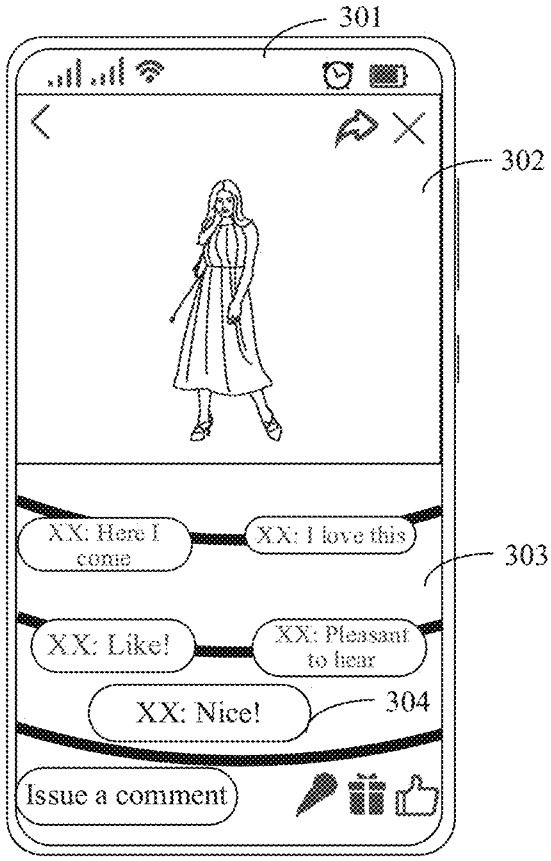
FIG. 3 is a schematic diagram of display of a video playing interface according to an exemplary embodiment of this application.

For example, as shown in FIG. 3, the terminal displays a video playing interface 301 and divides the video playing interface 301 into a video playing region 302 and a video comment region 303, so that an audience can issue a comment for a video in the video playing region 302 in the video comment region 303.

Operation 202. Obtain a comment issued by an audience account and spatial coordinates corresponding to the audience account, where the spatial coordinates are configured for indicating a spatial position at which the audience account is located in a virtual watching scene corresponding to the video.

In a possible implementation, when of receiving a trigger operation of entering the video playing interface and displaying the video playing interface, the terminal obtains an audience account of the audience, so that the audience can issue a comment by using the audience account as a unique identity.

In some embodiments, the comment issued by the audience may be in a form of text, or may be in a form of voice, or may be in another form such as a picture or an expression, which is not limited in the embodiments of this application.

In some embodiments, comments obtained by the terminal include a comment issued by an audience account at the terminal and a comment issued by another audience account. That is, the terminal may receive a plurality of comments simultaneously, and one comment corresponds to spatial coordinates corresponding to one audience account.

In a possible implementation, to simulate the three-dimensional sense at different positions when an audience watches performance on site in a real watching scene, the terminal constructs a virtual watching scene corresponding to a currently played video through the server and allocates corresponding spatial coordinates for each audience account issuing a comment, where the spatial coordinates are used for indicating a spatial position at which the audience account is located in the virtual watching scene corresponding to the video.

In some embodiments, different audience accounts may correspond to different spatial coordinates, or at least two audience accounts correspond to the same spatial coordinates.

In some embodiments, the virtual watching scene may be a spherical model, a cubic model, or a venue model, which is not limited in the embodiments of this application.

In some embodiments, a density of spatial positions in the virtual watching scene may be adjusted according to the video played in the video playing region, or may be adjusted according to an account quantity of audience accounts, which is not limited in the embodiments of this application.

Figure 4:
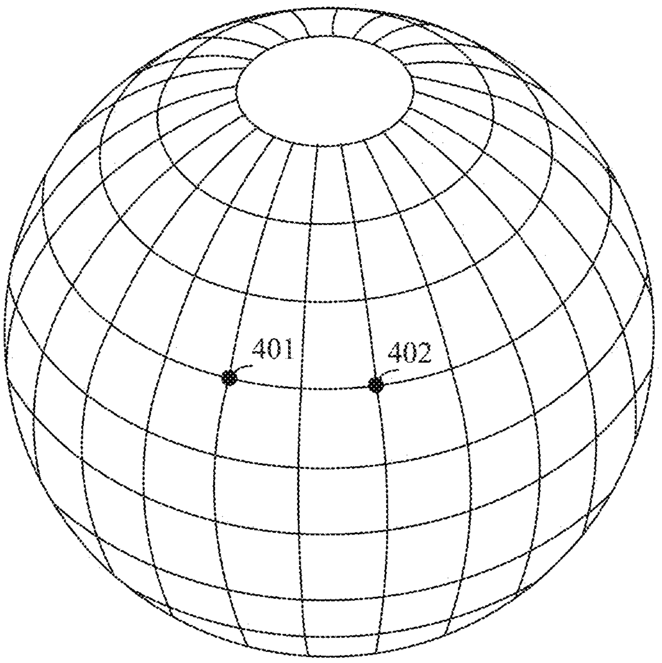
FIG. 4 is a schematic diagram of a three-dimensional spherical model according to an exemplary embodiment of this application.

In an example, as shown in FIG. 4, an example in which the virtual watching scene is a spherical model is used, the spherical model may be divided into longitude and latitude lines according to the principle of a geographical coordinate system, where a junction of a longitude line and a latitude line serves as spatial coordinates, such as first spatial coordinates 401 and second spatial coordinates 402.

In a possible implementation, the terminal obtains a comment issued by at least one audience account for the currently played video and spatial coordinates corresponding to the audience account. In some embodiments, the comment for the currently played video may be transmitted in real time by an audience account that currently watches the video or may be transmitted by an audience account that has watched the video before.

Operation 203. Determine a comment display attribute of the comment based on the spatial coordinates, where the comment display attribute includes a display position and a display effect of the comment in the video comment region.

In a possible implementation, because the spatial coordinates indicate the spatial position at which the audience account is located in the virtual watching scene and has the spatial three-dimensionality, but the comment is displayed in the video comment region in a form of a two-dimensional plane form, to enable the comment displayed in the video comment region to reflect the three-dimensional sense in the virtual watching scene, the terminal determines different comment display attributes corresponding to the comment in different spatial coordinates based on the spatial coordinates. A process of determining the comment display attribute based on the spatial coordinates is a process of determining a comment display attribute matching the spatial coordinates.

In some embodiments, the comment display attribute may include the display position and the display effect of the comment in the video comment region or another display attribute, which is not limited in the embodiments of this application. In some embodiments, the display effect may include a font size, display transparency, a display animation, or the like of the comment, which is not limited in the embodiments of this application.

Operation 204. Display the comment presenting the display effect at the display position in the video comment region.

In a possible implementation, the terminal renders and displays the comment at the display position by using the display effect corresponding to the comment according to the corresponding display position of the comment in the video comment region.

In some embodiments, content, a name of the audience account, an account avatar, or the like corresponding to the comment may be displayed at the display position, which is not limited in the embodiments of this application.

For example, as shown in FIG. 3, the terminal displays various comments 304 at different display positions based on different display effects in the video comment region 303.

Based on the above, in the embodiments of this application, the terminal displays the video and the video comment in the video playing interface in different regions, and divides the video playing interface into the video playing region and the video comment region. In addition, to simulate the three-dimensional sense of users located at different positions watching performance in a real watching scene, the terminal obtains the comment issued by the audience account and the spatial coordinates corresponding to the audience account from the server, where the spatial coordinates indicate the spatial position at which the audience account is located in the virtual watching scene corresponding to the video. Further, the terminal determines the comment display attribute of the comment in the video comment region based on the spatial coordinates, and displays the comment at the corresponding display position based on the display effect corresponding to the comment, thereby improving the three-dimensional sense of comment displaying in the video comment region and improving the diversity of the display effect of the comment.

In a possible implementation, the video comment region has limited display positions, comments corresponding to all spatial coordinates may not be displayed, so that the terminal can display comments corresponding to different spatial coordinates in the virtual watching scene by determining different fields of view, thereby improving the display effect of the comment in the video comment region.

Figure 5:
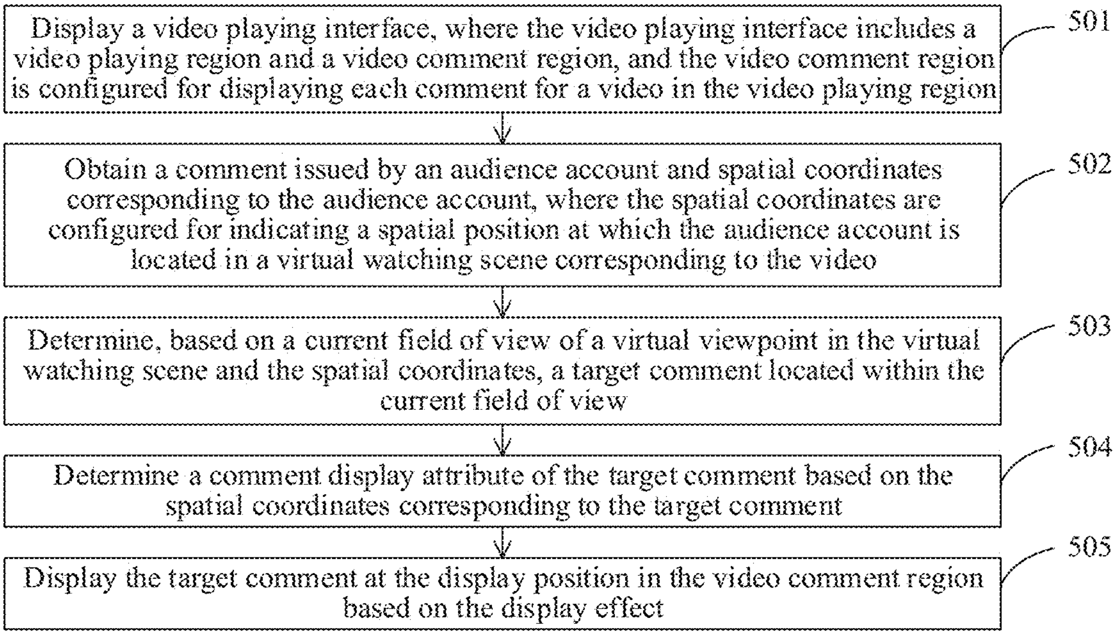
FIG. 5 is a flowchart of a video comment display method according to an exemplary embodiment of this application.

FIG. 5 is a flowchart of a video comment display method according to an exemplary embodiment of this application. This embodiment is described by using an example in which the method is applied to the terminal in FIG. 1, and the method includes the following operations:

Operation 501. Display a video playing interface, where the video playing interface includes a video playing region and a video comment region, and the video comment region is configured for displaying each comment for a video in the video playing region.

Operation 502. Obtain a comment issued by an audience account and spatial coordinates corresponding to the audience account, where the spatial coordinates are configured for indicating a spatial position at which the audience account is located in a virtual watching scene corresponding to the video.

For specific implementations of Operation 501 and Operation 502, reference may be made to Operation 201 and Operation 202, and details are not described in this embodiment.

Operation 503. Determine, based on a current field of view of a virtual viewpoint in the virtual watching scene and the spatial coordinates, a target comment located within the current field of view.

In a possible implementation, the video comment region has limited display positions, comments corresponding to all spatial coordinates may not be displayed, to improve a display effect, the terminal may first determine a virtual viewpoint, where a field of view corresponding to the virtual viewpoint may be determined by simulating a viewing angle of human eyes facing the virtual watching scene.

In some embodiments, the terminal may set a virtual camera or a virtual human eye model at a position of the virtual viewpoint in the virtual watching scene, and determine a visible range of the virtual camera or the virtual human eye model as the current field of view of the virtual viewpoint.

In a possible implementation, the terminal determines, based on the current field of view of the virtual viewpoint in the virtual watching scene and the spatial coordinates, a corresponding comment in the spatial coordinates within the current field of view as the target comment, that is, the spatial coordinates corresponding to the target comment are located within a coordinate range corresponding to the current field of view.

For a manner of screening the target comment, in a possible implementation, the terminal determines the coordinate range corresponding to the current field of view, determines whether the spatial coordinates corresponding to the comment are located within the coordinate range, determines the comment as the target comment if the spatial coordinates corresponding to the comment are located within the coordinate range, and determine that the comment does not belong to the target comment if the spatial coordinates corresponding to the comment are located outside the coordinate range.

Figure 6:
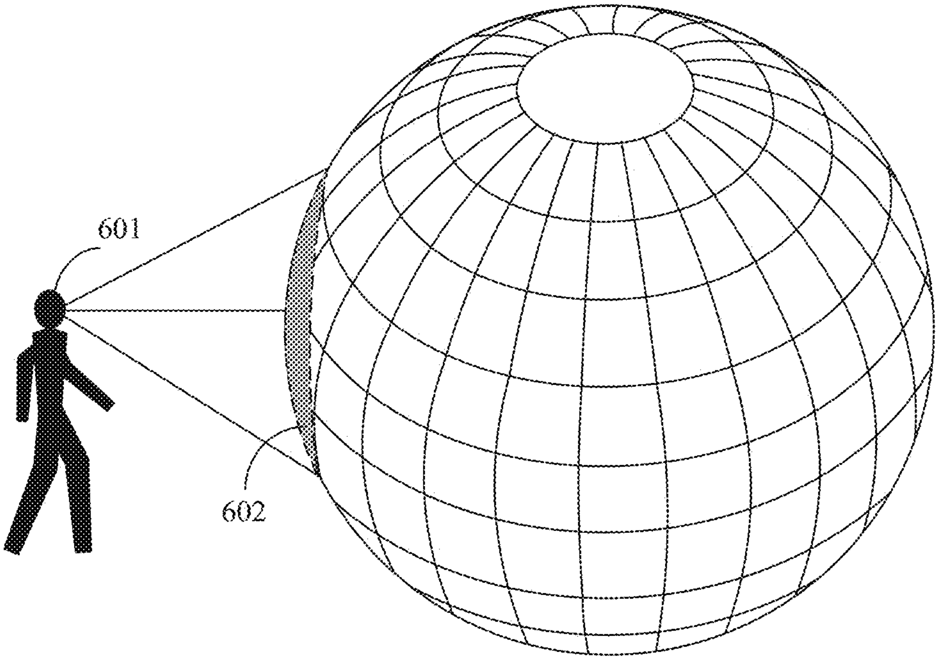
FIG. 6 is a schematic diagram of determining a current field of view according to an exemplary embodiment of this application.

For example, as shown in FIG. 6, based on a virtual viewpoint 601 in the virtual watching scene, the terminal simulates a viewing angle of human eyes facing the virtual watching scene by using the virtual viewpoint 601 as a base point to obtain a current field of view 602, and further determines a comment corresponding to the spatial coordinates located within the current field of view 602 as a target comment.

In a possible implementation, because the current field of view of the virtual viewpoint includes only comments corresponding to some spatial coordinates in the virtual watching scene, to enable an audience to see comments corresponding to spatial coordinates in different regions in the virtual watching scene, switching of the field of view of the virtual viewpoint is supported.

In a possible implementation, in response to a field of view switching operation in the video comment region, the terminal switches the current field of view of the virtual viewpoint in the virtual watching scene. In some embodiments, field of view switching in different directions including up, down, left, and right directions can be performed on the virtual watching scene based on the current virtual viewpoint. In some embodiments, the field of view switching operation may be a trigger operation on a field of view switching control or may be a gesture slide operation, which is not limited in the embodiments of this application.

In some embodiments, in response to the field of view switching operation, the terminal may implement field of view switching by switching a viewpoint position of the virtual viewpoint or implement field of view switching by adjusting a scene angle of the virtual watching scene. The following embodiments are described by using an example of adjusting the scene angle of the virtual watching scene to implement field of view switching, but this application is not limited thereto.

When that the field of view switching operation is implemented through a trigger operation on the field of view switching control, the terminal may set a fixed switching angle according to the virtual watching scene. Therefore, after receiving a trigger operation on the field of view switching control, the terminal switches the field of view of the virtual viewpoint according to the fixed switching angle, and redetermines a target comment within the current field of view.

In some embodiments, the terminal may determine the switching angle according to distribution of spatial positions in the virtual watching scene, and for example, the switching angle may be 45 degrees, 90 degrees, or the like.

Figure 7:
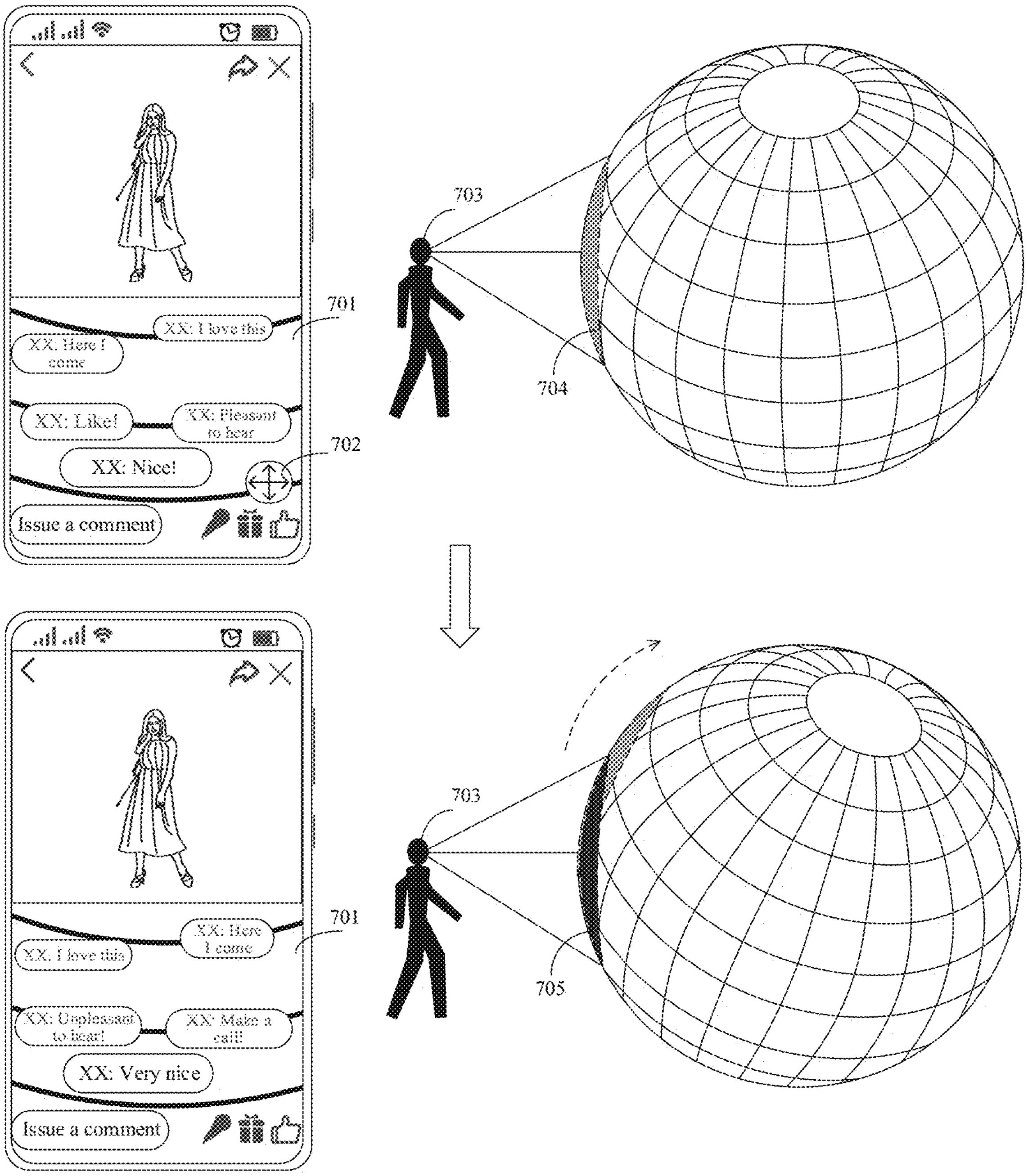
FIG. 7 is a schematic diagram of switching a current field of view through a field of view switching control according to an exemplary embodiment of this application.

For example, as shown in FIG. 7, a target comment within a current field of view 704 is displayed in a video comment region 701, and when of receiving a trigger operation on a downward switching button in a field of view switching control 702 in the video comment region 701, the terminal redetermines a current field of view 705 (obtained by rotating the virtual watching scene) of a virtual viewpoint 703 and redetermines a target comment corresponding to spatial coordinates within the current field of view 705, to display the target comment within the current field of view 705 in the video comment region 701.

When that the field of view switching operation is implemented through a gesture slide operation, the terminal may also set a fixed switching angle according to the virtual watching scene. Therefore, after receiving a gesture slide operation, the terminal switches the field of view of the virtual viewpoint according to the fixed switching angle, and redetermines a target comment within the current field of view.

Figure 8:
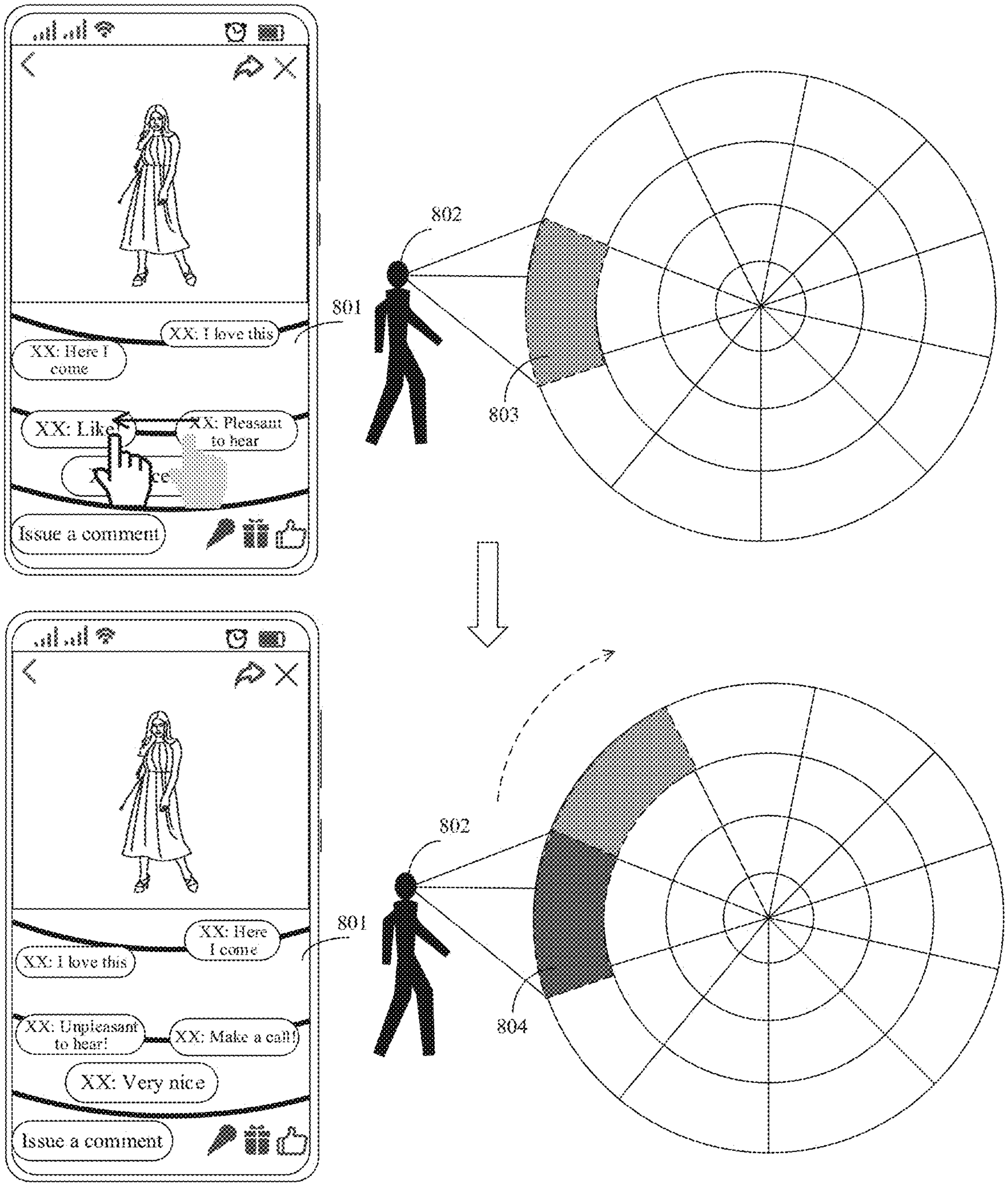
FIG. 8 is a schematic diagram of switching a current field of view through a gesture operation according to an exemplary embodiment of this application.

For example, as shown in FIG. 8, a target comment within a current field of view 803 is displayed in a video comment region 801, and when of receiving a leftward slide gesture operation in the video comment region 801, the terminal switches a field of view of a virtual viewpoint 802 according to a corresponding switching angle (by rotating an angle of the virtual watching scene), determines a current field of view 804, and further redetermines a target comment corresponding to spatial coordinates within the current field of view 804, to redisplay the target comment in the video comment region 801.

When that the field of view switching operation is implemented through a gesture slide operation, the terminal may alternatively determine a corresponding switching angle according to a gesture slide length of the audience in the video comment region, to flexibly adjust the field of view of the virtual viewpoint.

In a possible implementation, to enable a current audience to directly see a comment issued by the current audience in the video comment region after issuing the comment, after receiving a comment issuing operation of a current audience account, the terminal obtains spatial coordinates corresponding to the current audience account.

When that the spatial coordinates corresponding to the current audience account are located within the current field of view, the terminal directly uses the comment within the current field of view as the target comment; and when that the spatial coordinates corresponding to the current audience account are located outside the current field of view, the terminal switches the current field of view of the virtual viewpoint in the virtual watching scene based on the spatial coordinates corresponding to the current audience account, so that the spatial coordinates corresponding to the current audience account are located within the current field of view after the switching, and the terminal redetermines the target comment within the current field of view.

In a possible implementation, when that the spatial coordinates corresponding to the current audience account are located outside the current field of view, the terminal determines, by using the spatial coordinates currently corresponding to the current audience account as a reference point, a target field of view including the reference point, to determine a field of view switching manner based on the current field of view and the target field of view and perform field of view switching.

In some embodiments, the spatial coordinates corresponding to the current audience account may be located at a center of the current field of view after the switching or may be located at another position of the current field of view after the switching, which is not limited in the embodiments of this application.

Figure 9:
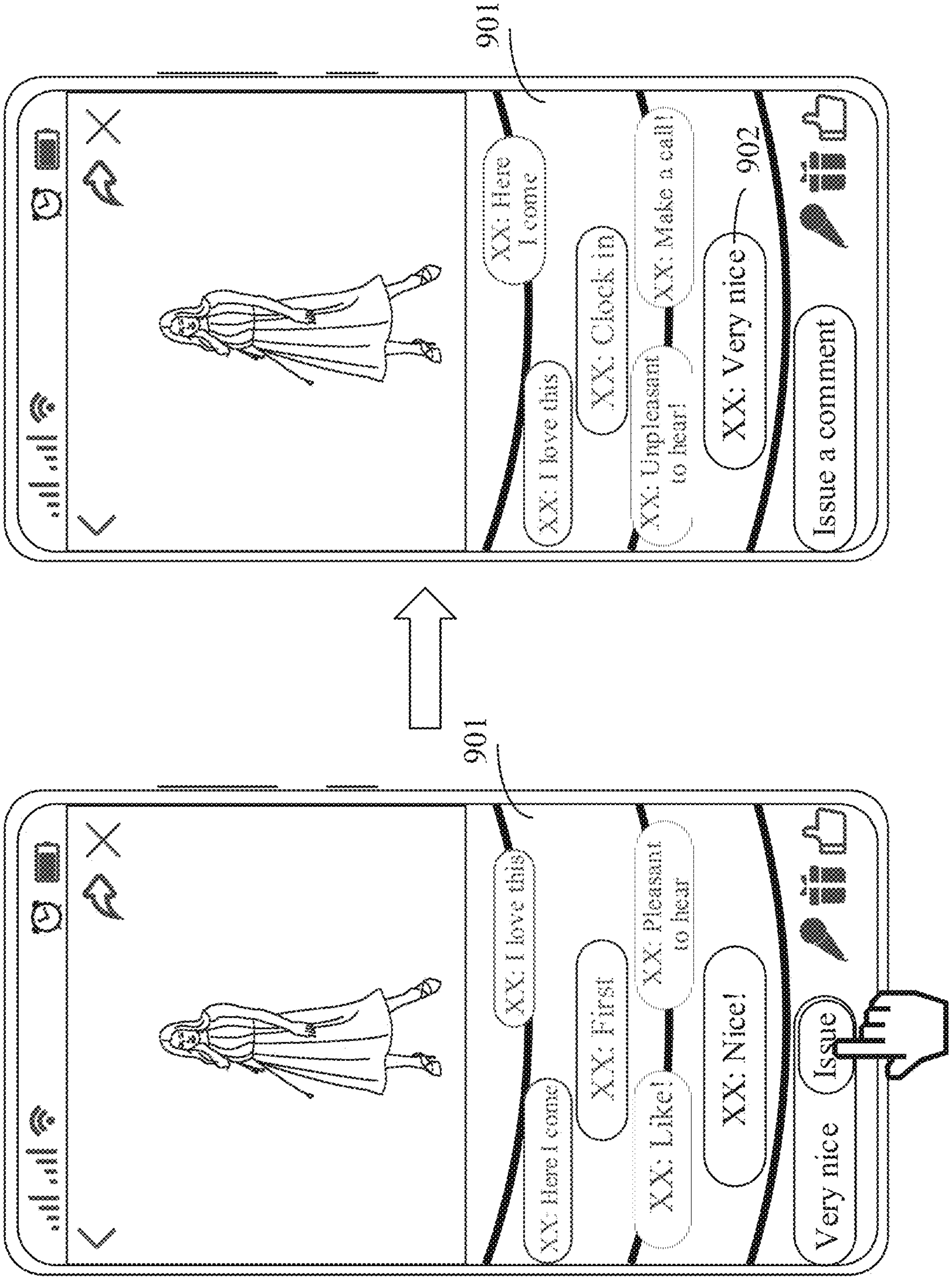
FIG. 9 is a schematic diagram of switching a current field of view based on a comment issuing operation according to an exemplary embodiment of this application.

For example, as shown in FIG. 9, when that the spatial coordinates corresponding to the current audience account are located outside the current field of view, comments corresponding to spatial coordinates within the current field of view are displayed in a video comment region 901, and after receiving the comment issuing operation of the current audience account, the terminal switches the current field of view of the virtual viewpoint in the virtual watching scene based on the spatial coordinates corresponding to the current audience account, to display the comment corresponding to the spatial coordinates within the current field of view in the video comment region 901, so that a comment 902 issued by the current audience account is displayed in the video comment region 901.

Operation 504. Determine a comment display attribute of the target comment based on the spatial coordinates corresponding to the target comment.

In a possible implementation, to simulate a visual effect of human eyes facing the virtual watching scene in a more real manner, the terminal uses the position of the virtual viewpoint as a visual center of human eyes, to determine the comment display attribute of the target comment within the current field of view corresponding to the virtual viewpoint, and the process may include the following sub-operations.

1. Determine Viewpoint Coordinates of the Virtual Viewpoint.

The terminal first determines viewpoint coordinates of the virtual viewpoint within the current field of view, and uses the viewpoint coordinates as a visual center of simulated human eyes.

In a possible implementation, to enable the current audience account to directly see the comment issued by the current audience account after issuing the comment, the terminal determines, when that spatial coordinates are allocated to the current audience account, the viewpoint coordinates of the virtual viewpoint based on the spatial coordinates corresponding to the current audience account, so that the spatial coordinates corresponding to the current audience account are located within the field of view of the virtual viewpoint.

In a possible implementation, to simulate a watching visual effect of a current audience in a real scene, when that spatial coordinates are allocated to the current audience account, the terminal may directly use the spatial coordinates corresponding to the current audience account as the viewpoint coordinates of the virtual viewpoint.

In a possible implementation, when spatial coordinates are not allocated to the current audience account, the terminal may randomly determine the viewpoint coordinates of the virtual viewpoint in the virtual watching scene or may determine the viewpoint coordinates of the virtual viewpoint according to spatial coordinates corresponding to another audience account having a social relationship with the current audience account. The spatial coordinates corresponding to another audience account having a social relationship with the current audience account are located within the field of view of the virtual viewpoint.

In a possible implementation, when that spatial coordinates are not allocated to the current audience account, to display as much comments to the current audience as possible, the terminal may determine the viewpoint coordinates of the virtual viewpoint based on a comment dense region in the virtual watching scene, and enable the field of view of the virtual viewpoint to intersect with the comment dense region.

In some embodiments, the comment dense region may be all located with the field of view of the virtual viewpoint or may be partially located within the field of view of the virtual viewpoint, which is not limited in the embodiments of this application.

In some embodiments, the comment dense region may be a region in which a comment density is greater than a density threshold or may be a region with a highest comment density, and the comment density can be determined according to a total quantity of comments within a period of time.

In a possible implementation, the virtual watching scene is divided into a plurality of regions (adjacent regions do not overlap with each other or partially overlap with each other), a total quantity of comments issued by audience accounts in each region within first duration is a comment density of the region, and the terminal determines a region with a highest comment density as the comment dense region.

2. Determine the Comment Display Attribute of the Target Comment Based on the Viewpoint Coordinates and the Spatial Coordinates Corresponding to the Target Comment.

In a possible implementation, to simulate a visual effect of human eyes during focusing, the terminal determines the comment display attribute of the target comment based on the viewpoint coordinates and the spatial coordinates corresponding to each target comment within the field of view.

In a possible implementation, the terminal may determine a display position of the target comment in the video comment region based on a relative position relationship between the viewpoint coordinates and the spatial coordinates corresponding to the target comment.

For example, when the viewpoint coordinates are located on a left side of the spatial coordinates, the display position of the target comment is located on a left side of the video comment region; and when the viewpoint coordinates are located on a right side of the spatial coordinates, the display position of the target comment is located on a right side of the video comment region.

In a possible implementation, according to a feature that visual effects generated by human eyes during focusing for objects at different distances are different, the terminal determines display effects of target comments located at different display positions based on a distance between the viewpoint coordinates and the spatial coordinates of each target comment. The display effect may include a display size and display transparency, where the display size is negatively correlated with the distance, that is, a closer distance between the spatial coordinates corresponding to the target comment and the viewpoint coordinates indicates a larger display size corresponding to the target comment, to simulate a visual effect that everything looks small in the distance and big on the contrary. The display transparency is positively correlated with the distance, that is, a closer distance between the spatial coordinates corresponding to the target comment and the viewpoint coordinates indicates lower display transparency corresponding to the target comment, to simulate a visual effect that everything looks clear in the distance and fuzzy on the contrary.

In an example in which the virtual watching scene is a spherical model, spatial coordinates of a comment may be expressed as (X, Y, Z), and a calculation manner of the comment display attribute may be:

$$Per=\left(\frac{D}{D+Z}\right)\times E$$

D is a spherical diameter of the spherical model, Z is a difference between the spatial coordinates and the viewpoint coordinates in a Z-axis direction, and E is an experience value and may be adjusted according to an actual display requirement, where a smaller distance between the spatial coordinates of the comment and the viewpoint coordinates indicates a greater value of Per; and a greater distance between the spatial coordinates of the comment and the viewpoint coordinates indicates a smaller value of Per.

A calculation manner of the display position may be: $(X_1, Y_1)=Per\times(X, Y)$ $(X_1, Y_1)$ is a display position of the video comment region, and (X, Y) indicates coordinate differences between the spatial coordinates and the viewpoint coordinates in an X-axis direction and a Y-axis direction.

A calculation manner of the display size may be Scale=Per. That is, a smaller distance between the comment and the viewpoint position indicates a greater display size of the comment; and a greater distance between the comment and the viewpoint position indicates a smaller display size of the comment.

A calculation manner of the display transparency may be Alpha=(Z+R)/D, where R is a spherical radius of the spherical model, D is a spherical diameter of the spherical model, and Z is a difference between the spatial coordinates and the viewpoint coordinates in a Z-axis direction. That is, a smaller distance between the comment and the viewpoint position indicates lower display transparency and a clearer comment.

In a possible implementation, when that comment content is in a form of voice, the terminal may further determine a playing volume of the voice according to the distance between the spatial coordinates corresponding to the comment and the viewpoint coordinates, to simulate an acoustic effect that a closer distance brings louder voice in a real scene.

In a possible implementation, to improve the comment display efficiency, after relative coordinates (which may be an absolute value of coordinate differences between the viewpoint coordinates and the spatial coordinates) of the viewpoint coordinates and the spatial coordinates corresponding to the target comment are determined, the terminal may directly search a display attribute table for the comment display attribute of the target comment according to the relative coordinates, where the display attribute table is configured by the server based on the virtual watching scene, and the display attribute table includes a correspondence between different relative coordinate ranges and comment display attributes. For example, the correspondence between different relative coordinate ranges and comment display attributes in the display attribute table may be shown in FIG. 1.

TABLE 1

| Relative coordinate range | Comment display attribute |
|---|---|
| (1, 1, 1) to (1, 1, 2) | Font size: four, transparency: 10% |
| (1, 1, 2) to (1, 1, 3) | Font size: small four, transparency: 25% |
| (1, 1, 3) to (1, 1, 4) | Font size: five, transparency: 40% |

Operation 505. Display the target comment at the display position in the video comment region based on the display effect.

In a possible implementation, the terminal renders and displays each target comment by using the display effect corresponding to the target comment according to the corresponding display position of the target comment in the video comment region.

In some embodiments, content, a name of the audience account, an account avatar, or the like corresponding to the target comment may be displayed at the display position, which is not limited in the embodiments of this application.

Figure 10:
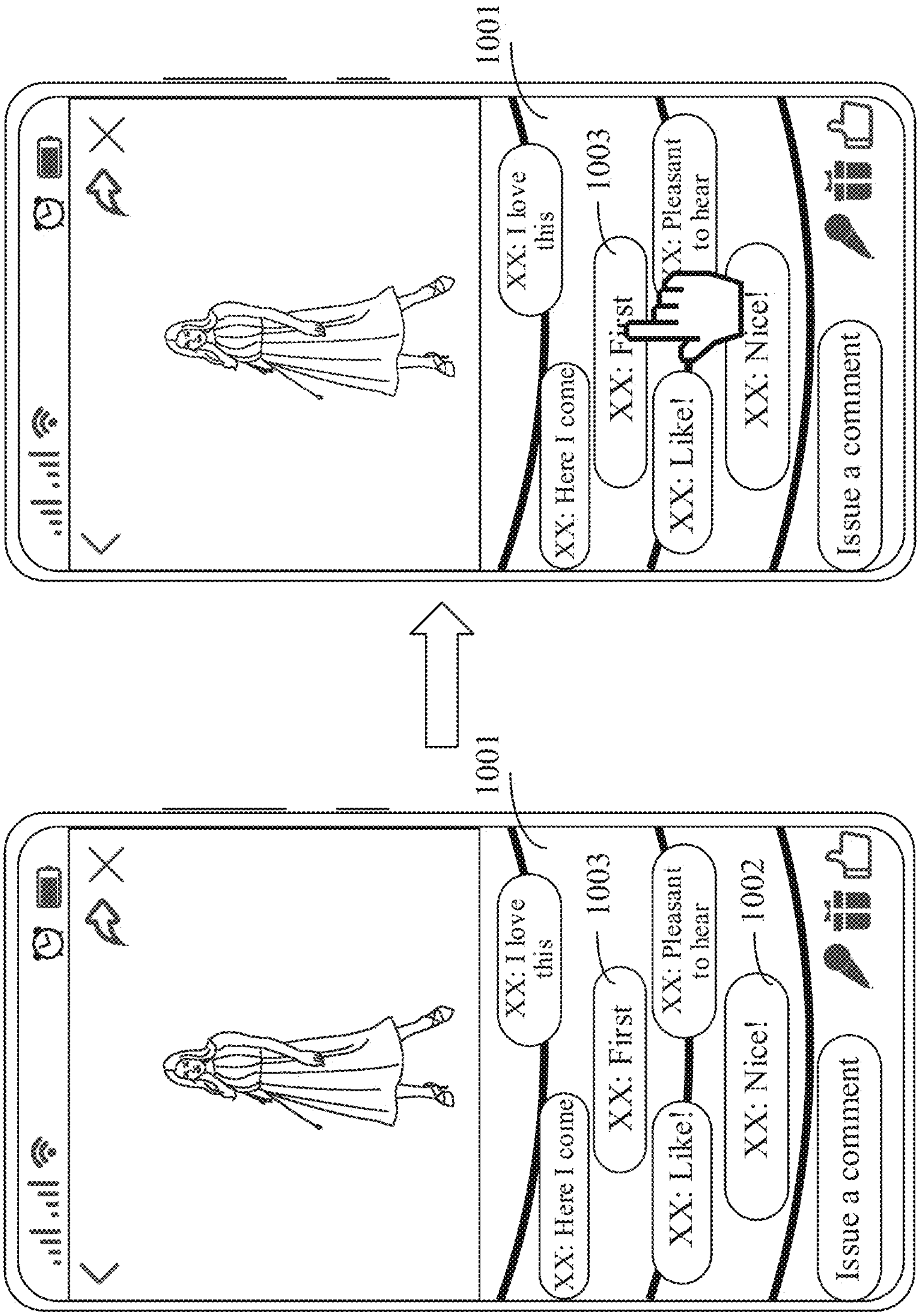
FIG. 10 is a schematic diagram of adjusting a comment display attribute according to an exemplary embodiment of this application.

For example, as shown in FIG. 10, the terminal renders and displays target comments at various display positions by using display effects corresponding to the target comments in a video comment region 1001. A first comment 1002 is closer to a viewpoint while a second comment 1003 is farther from the viewpoint, so that a display size of the first comment 1002 is greater than a display size of the second comment 1003, and display transparency of the first comment 1002 is lower than display transparency of the second comment 1003.

In a possible implementation, when that the current field of view is not changed, to enable the audience to clearly see comment content far from the viewpoint position, when that the terminal receives a trigger operation of the audience on a comment, the terminal may adjust the comment display attribute of the comment and display the comment in a time threshold corresponding to an adjusted comment display attribute. In some embodiments, the time threshold may be determined according to duration of the received trigger operation, or may be fixed duration, or may be determined in another possible implementation, which is not limited in the embodiments of this application.

In some embodiments, when of receiving a trigger operation on a comment, the terminal may adjust the comment display attribute of the comment according to a uniform adjustment policy, for example, adjust the comment display attribute of the comment according to a maximum display size and lowest display transparency.

For example, as shown in FIG. 10, when of receiving a trigger operation by the audience on the second comment 1003, the terminal adjusts the comment display attribute of the second comment 1003 by increasing the display size and lowering the transparency, so that the audience can clearly see the second comment 1003.

In a possible implementation, to improve the display effect and interactivity of the comment, the terminal may adjust, based on the comment display attribute determined based on the coordinates and according to account association information of an audience account, the comment display attribute of the comment issued by the audience account. The account association information may include an account level, a social affinity with the current audience account, an account recharge situation, or the like, which is not limited in this embodiment.

In some embodiments, when that distances between spatial coordinates corresponding to at least audience accounts and the viewpoint coordinates are the same, the terminal may adjust the comment display attribute of the comment issued by each audience account according to an account level or a social affinity with the current audience account of the audience account.

For example, when that distances between spatial coordinates corresponding to audience accounts and the viewpoint coordinates are the same, a higher account level or a higher social affinity with the current audience account of an audience account indicates a larger display size or lower display transparency of the comment issued by the audience account or indicates that the comment has an animation effect.

In the foregoing embodiments, the terminal displays target comments corresponding to the spatial coordinates within different fields of view by switching the current field of view of the virtual viewpoint, thereby simulating a viewing angle of human eyes in a real watching scene and improving the display efficiency of the comment in the video comment region.

In addition, the terminal determines the comment display attribute of the target comment according to the viewpoint coordinates and the spatial coordinates corresponding to the target comment, so that a comment closer to the viewpoint has a better display effect, thereby simulating a visual effect of human eyes during focusing, optimizing the comment display effect of the video comment region, and improving the realness and three-dimensional sense of comment displaying.

In addition, the terminal directly obtains the comment display attribute corresponding to the target comment from the display attribute table by determining the relative coordinates of the viewpoint coordinates and the spatial coordinates corresponding to the target comment, improving the display efficiency of the target comment.

In a possible implementation, because the video comment region can display only a limited quantity of comments, when a comment quantity of target comments within the current field of view is greater than a threshold, the terminal may perform comment screening on the target comments to display only a screened target comment.

In a possible implementation, when that a comment quantity of target comments is greater than a threshold, the terminal determines a first display priority of each target comment, where the first display priority is related to an audience account issuing the target comment and issuing time of the target comment.

For a manner of determining the display priority of the target comment, in some embodiments, when that the target comment belongs to the current audience account, the terminal determines that the first display priority of the target comment is the highest; and when that the target comment belongs to another audience account, the terminal may determine the first display priority of the target comment according to a social affinity between the another audience account and the current audience account, where a higher social affinity indicates a higher first display priority.

In some embodiments, the first display priority may alternatively be positively correlated with an account level of an audience account issuing the target comment, where a higher account level of the audience account indicates a higher first display priority corresponding to the target comment.

In some embodiments, the first display priority may be positively correlated with issuing time of the target comment, where longer issuing time of the target comment indicates a higher first display priority.

Further, the terminal performs screening on the target comments based on the first display priority to obtain the screened target comment, and a comment quantity of the screened target comment is less than or equal to the threshold, so that the terminal displays the screened target comment at the corresponding display position in the video comment region based on the display effect of the target comment.

In the foregoing embodiment, in the case that the comment quantity of target comments is greater than the threshold, the target comments are screened according to the first display priority, so that the display efficiency of the target comment is improved, display content in the video comment region is simplified, and problems that the display quality is affected and the terminal has excessively great processing pressure when excessive comments are displayed simultaneously can be avoided.

In a possible implementation, because the same spatial coordinates may correspond to a plurality of comments when that there are excessive comments, that is, a plurality of comments need to be displayed at the same display position, to improve the display efficiency of the comment in the video comment region, the terminal may display the plurality of comments at the same display position according to a second display priority.

In a possible implementation, the terminal displays, when that the same display position corresponds to one comment, the comment within display duration corresponding to the comment; and the terminal determines, when that the same display position corresponds to at least two comments, a second display priority corresponding to each of the at least two comments, where the second display priority is related to an audience account issuing the comment and issuing time of the comment, so that the terminal displays the at least two comments in sequence according to the second display priority and display duration corresponding to each of the at least two comments.

In some embodiments, the display duration corresponding to each comment may be the same or may be different. In a possible implementation, the terminal may determine the display duration according to the account level of the audience account corresponding to each comment, where a higher account level of the audience account indicates longer display duration of the comment issued by the audience account. The terminal may alternatively determine the display duration of each comment according to the social affinity between the audience account corresponding to the comment and the current audience account, where a higher social affinity between the audience account corresponding to the comment and the current audience account indicates longer display duration of the comment.

In the foregoing embodiment, when that the same display position corresponds to a plurality of comments, the comments are screened according to the second display priority, so that display of a comment with a lower second display priority is reduced, thereby improving the display efficiency of the comment in the video comment region.

In a possible implementation, to simulate an effect that an audience enters a venue for watching performance in a real scene in a more real manner, after receiving a trigger operation of entering the video playing interface, the terminal displays a spatial position selection control while displaying the video playing interface, where the spatial position selection control is configured for selecting the spatial coordinates corresponding to the current audience account. The terminal determines, in response to a trigger operation on the spatial position selection control, the spatial coordinates corresponding to the current audience account according to the trigger operation.

In some embodiments, the spatial position selection control may be in a form of filling coordinate information, or may be in a form of performing selection by triggering a control corresponding to each seat (different seats correspond to different spatial coordinates), which is not limited in the embodiments of this application.

Figure 11:
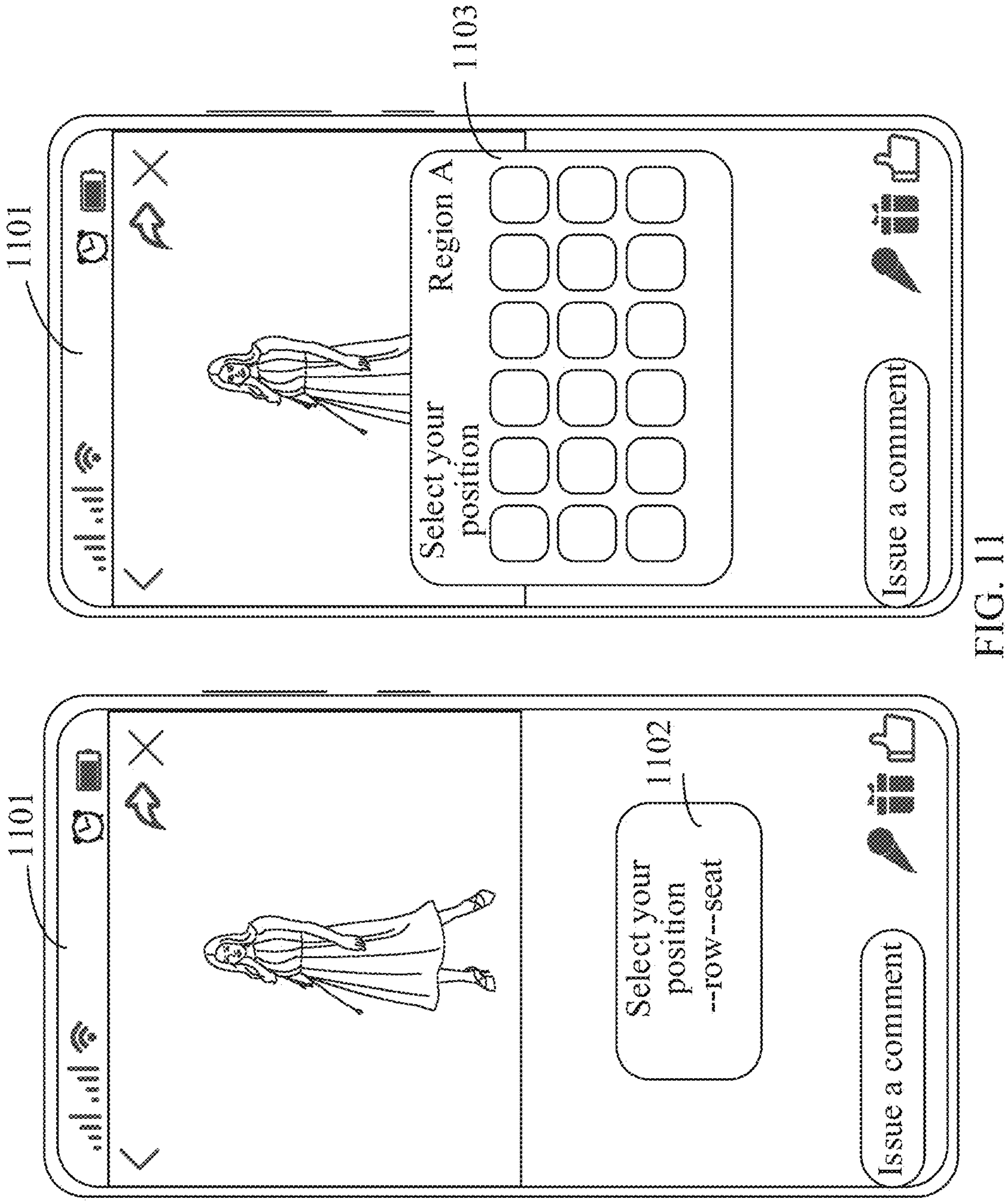
FIG. 11 is a schematic diagram of displaying a spatial position selection control according to an exemplary embodiment of this application.

For example, as shown in FIG. 11, the terminal displays a first spatial position selection control 1102 in a video playing interface 1101, and an audience can input a specific row and a seat sequence number in the first spatial position selection control 1102. Alternatively, the terminal displays a second spatial position selection control 1103 in the video playing interface 1101, and an audience can trigger a control corresponding to a seat in the second spatial position selection control 1103 to determine selected spatial coordinates.

In a possible implementation, to enable the audience to see a comment issued by another audience account having a social relationship with the current audience account after entering the video playing interface and simulate an effect that at least two audiences together watch performance in a real scene, the terminal may first obtain spatial coordinates of the another audience account having a social relationship with the current audience account while displaying the spatial position selection control, to perform spatial position recommendation to the current audience account when the current audience is performing spatial position selection.

Figure 12:
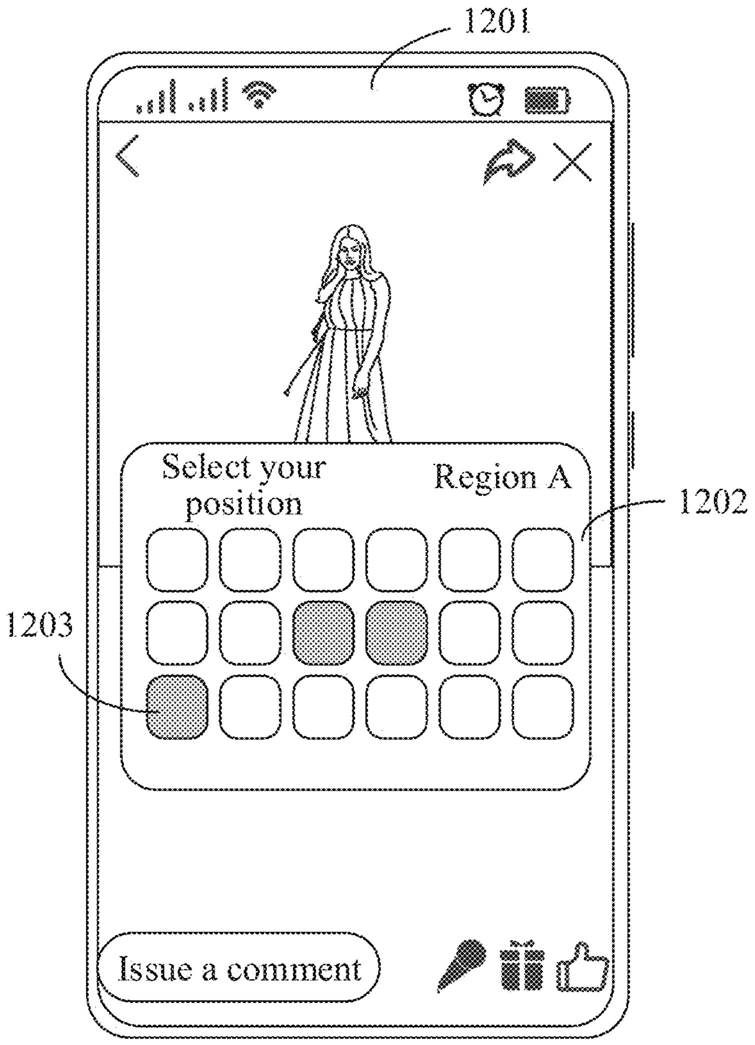
FIG. 12 is a schematic diagram of a spatial position selection prompt according to an exemplary embodiment of this application.

For example, as shown in FIG. 12, the terminal displays a second spatial position selection control 1202 in a video playing interface 1201 and fills and displays a spatial position 1203 of another audience account having a social relationship with the current audience account in the second spatial position selection control 1202, to implement spatial position recommendation to the current audience account.

In a possible implementation, to improve the spatial coordinate allocation efficiency, when that the current audience account first enters the video playing interface, the terminal directly obtains spatial coordinates allocated by the server to the current audience account. Further, to meet that the audience selects the spatial coordinates, when that the current audience account needs to perform spatial position selection again, in response to a call-out operation on the spatial position selection control, the terminal displays the spatial position selection control for the current audience account to perform spatial position selection again.

In a possible implementation, to improve the comment interactivity between audience accounts, when that the current audience account first enters the video playing interface, the terminal allocates, according to spatial coordinates of another audience account having a social relationship with the current audience account, spatial coordinates to the current audience account at a position adjacent to the spatial coordinates corresponding to another audience account.

In a possible implementation, when an audience does not have a demand for issuing a comment and only needs to view a comment issued by another audience account, to save spatial coordinate resources, when that the current audience account enters the video playing interface, the terminal does not directly obtain the spatial coordinates allocated by the server to the current audience account, and the terminal obtains the spatial coordinates allocated by the server to the current audience account only when a comment issuing operation is received and spatial coordinates are not allocated to the current audience account.

In the foregoing embodiments, a chance for selecting a spatial position is provided to the audience by displaying the spatial position selection control in the video playing interface, to simulate an effect of position allocation when the audience enters a venue for watching performance in a real scene, thereby improving the audience's sense of participation and experience in issuing a comment while watching a video.

Figure 13:
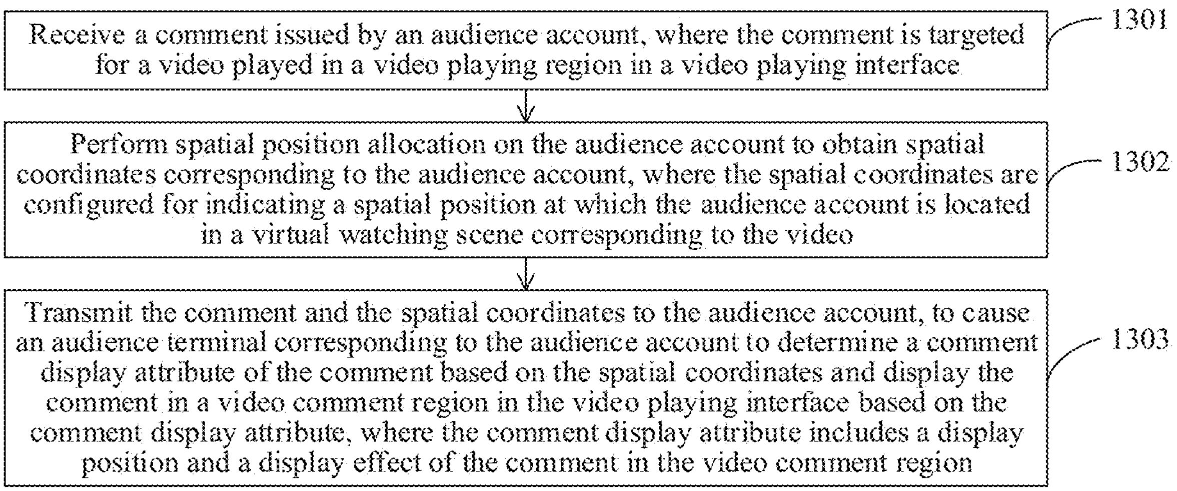
FIG. 13 is a flowchart of a video comment display method according to an exemplary embodiment of this application.

FIG. 13 is a flowchart of a video comment display method according to an exemplary embodiment of this application. This embodiment is described by using an example in which the method is applied to the server in FIG. 1, and the method includes the following operations:

Operation 1301. Receive a comment issued by an audience account, where the comment is targeted for a video played in a video playing region in a video playing interface.

In a possible implementation, after the terminal receives the comment issued by each audience account in the video playing interface, the terminal transmits the comment issued by the audience account to the server, and the server receives the comment issued by the audience account, where the comment is targeted for the video played in the video playing region in the video playing interface.

In some embodiments, in addition to receiving the comment issued by the audience account, the server may further receive account information corresponding to the audience account and account information of another audience account having a social relationship with the audience account.

Operation 1302. Perform spatial position allocation on the audience account to obtain spatial coordinates corresponding to the audience account, where the spatial coordinates are configured for indicating a spatial position at which the audience account is located in a virtual watching scene corresponding to the video.

In a possible implementation, the server constructs a virtual watching scene based on the video in the video playing interface, and determines distribution of spatial coordinates in the virtual watching scene, where the spatial coordinates are configured for indicating the spatial position at which the audience account is located in the virtual watching scene corresponding to the video in the video playing interface.

In some embodiments, the server may be pre-configured with virtual watching scenes with different spatial coordinate distribution densities or may adjust spatial coordinate distribution in the virtual watching scene according to video content, which is not limited in the embodiments of this application.

In a possible implementation, the server performs spatial position allocation on at least one audience account to obtain spatial coordinates corresponding to the at least one audience account. In some embodiments, the same spatial coordinates may correspond to one audience account or may correspond to a plurality of audience accounts, which is not limited in the embodiments of this application.

In a possible implementation, the server may allocate, according to a social relationship between audience accounts, the audience accounts having the social relationship to adjacent spatial coordinates.

Operation 1303. Transmit the comment and the spatial coordinates to the audience account, to cause an audience terminal corresponding to the audience account to determine a comment display attribute of the comment based on the spatial coordinates and display the comment in a video comment region in the video playing interface based on the comment display attribute, where the comment display attribute includes a display position and a display effect of the comment in the video comment region.

In a possible implementation, the server transmits a comment issued by at least one audience account and spatial coordinates corresponding to the audience account to each audience account of a currently played video, so that the audience terminal corresponding to each audience account determines the comment display attribute of the comment in the video comment region according to the spatial coordinates, and displays the comment in the video comment region in the video playing interface based on the comment display attribute, where the comment display attribute includes the display position and the display effect of the comment in the video comment region.

In a possible implementation, to improve the comment display efficiency, the server directly configures a display attribute table based on spatial coordinate distribution in the virtual watching scene and according to relative coordinates of viewpoint coordinates and the spatial coordinates, where the display attribute table includes a correspondence between different relative coordinates and comment display attributes, so that the server directly transmits the comment issued by the at least one audience account and the comment display attribute corresponding to the audience account to the audience terminal.

Based on the above, in this embodiment of this application, after receiving the comment issued by the audience account, the server allocates the spatial coordinates to the audience account, to transmit the comment and the spatial coordinates corresponding to the audience account to the audience terminal corresponding to each audience account, and the audience terminal determines the comment display attribute of the comment based on the spatial coordinates and display the comment in the video comment region, thereby simulating a three-dimensional sense that audiences located at different positions watch performance and issue comments in a real watching scene.

Figure 14:
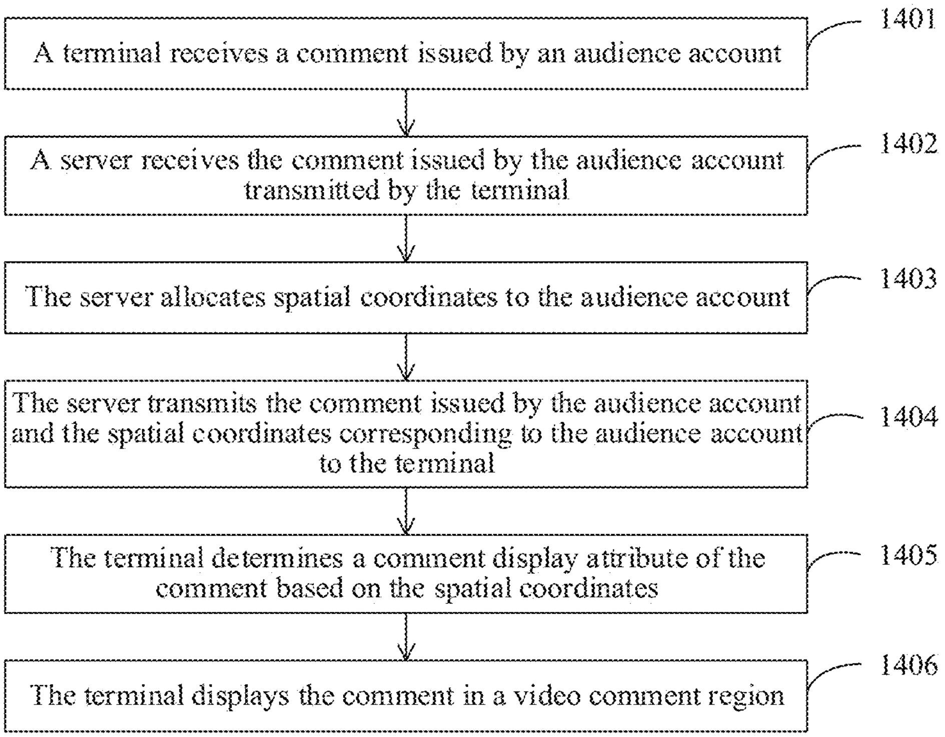
FIG. 14 is a flowchart of interaction between a terminal and a server in a video comment display process according to an exemplary embodiment of this application.

FIG. 14 is a flowchart of interaction between a terminal and a server in a video comment display process according to an exemplary embodiment of this application.

Operation 1401. The terminal receives a comment issued by an audience account.

When of receiving a comment issuing operation, the terminal obtains information about the audience account and the comment issued by the audience account, to transmit the audience account and the comment corresponding to the audience account to the server.

Operation 1402. The server receives the comment issued by the audience account transmitted by the terminal.

The server receives the audience account and the comment issued by the audience account transmitted by the terminal.

Operation 1403. The server allocates spatial coordinates to the audience account.

The server performs spatial coordinate allocation on the audience account based on spatial position distribution in the virtual watching scene.

Operation 1404. The server transmits the comment issued by the audience account and the spatial coordinates corresponding to the audience account to the terminal.

Operation 1405. The terminal determines a comment display attribute of the comment based on the spatial coordinates.

Further, the terminal determines the comment display attribute corresponding to each comment based on the spatial coordinates, that is, determines a display position and a display effect of each comment.

Operation 1406. The terminal displays the comment in a video comment region.

The terminal renders and displays each comment based on the display effect at the display position corresponding to each comment in the video comment region.

Information (including but not limited to user account information, user personal information, and user social relationships), data (including but not limited to data configured for analysis, stored data, and presented data), and signals involved in this application are all authorized by a user or fully authorized by each party, and collection, usage, and processing of related data need to comply with related laws, regulations, and standards of related countries and regions. For example, the account association information involved in the embodiments of this application is obtained under authorization by the user.

Figure 15:
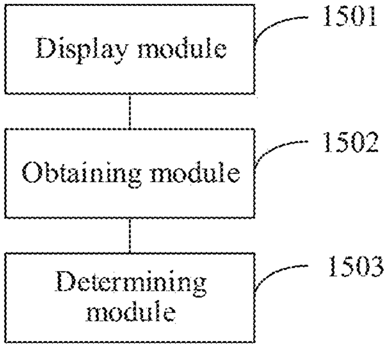
FIG. 15 is a structural block diagram of a video comment display apparatus according to an exemplary embodiment of this application.

FIG. 15 is a structural block diagram of a video comment display apparatus according to an exemplary embodiment of this application. The apparatus includes:

a display module 1501, configured to display a video playing interface, where the video playing interface includes a video playing region and a video comment region, and the video comment region is configured for displaying each comment for a video in the video playing region;

an obtaining module 1502, configured to obtain a comment issued by an audience account and spatial coordinates corresponding to the audience account, where the spatial coordinates are configured for indicating a spatial position at which the audience account is located in a virtual watching scene corresponding to the video;

a determining module 1503, configured to determine a comment display attribute of the comment based on the spatial coordinates, where the comment display attribute includes a display position and a display effect of the comment in the video comment region; and the display module 1501 being further configured to display the comment presenting the display effect at the display position in the video comment region.

In some embodiments, the determining module 1503 includes:

a comment determining unit, configured to determine, based on a current field of view of a virtual viewpoint in the virtual watching scene and the spatial coordinates, a target comment located within the current field of view; and an attribute determining unit, configured to determine comment display attribute of the target comment based on the spatial coordinates corresponding to the target comment; and the display module 1501 is configured to:

display the target comment presenting the display effect at the display position in the video comment region.

In some embodiments, the attribute determining unit is configured to:

determine viewpoint coordinates of the virtual viewpoint; and determine the comment display attribute of the target comment based on the viewpoint coordinates and the spatial coordinates corresponding to the target comment.

In some embodiments, the attribute determining unit is configured to:

determine a display position of the target comment based on a relative position relationship between the viewpoint coordinates and the spatial coordinates corresponding to the target comment; and determine a display effect of the target comment based on a distance between the viewpoint coordinates and the spatial coordinates corresponding to the target comment, where the display effect includes a display size and display transparency, the display size is negatively correlated with the distance, and the display transparency is positively correlated with the distance.

In some embodiments, the attribute determining unit is configured to:

determine relative coordinates of the viewpoint coordinates and the spatial coordinates corresponding to the target comment; and search a display attribute table for the comment display attribute of the target comment based on the relative coordinates, where the display attribute table includes a correspondence between different relative coordinate ranges and comment display attributes.

In some embodiments, the attribute determining unit is further configured to:

determine, when that spatial coordinates are allocated to a current audience account, the viewpoint coordinates of the virtual viewpoint based on the spatial coordinates corresponding to the current audience account, where the spatial coordinates corresponding to the current audience account are located within the field of view of the virtual viewpoint; or randomly determine, when that spatial coordinates are not allocated to a current audience account, the viewpoint coordinates of the virtual viewpoint in the virtual watching scene, or determine the viewpoint coordinates of the virtual viewpoint based on a comment dense region in the virtual watching scene, where the field of view of the virtual viewpoint intersects with the comment dense region.

In some embodiments, the apparatus further includes:

a switching module, configured to switch the current field of view of the virtual viewpoint in the virtual watching scene in response to a field of view switching operation within the video comment region.

In some embodiments, the obtaining module 1502 is configured to obtain the spatial coordinates corresponding to the current audience account in response to a comment issuing operation; and the switching module is configured to switch, when that the spatial coordinates corresponding to the current audience account are located outside the current field of view, the current field of view of the virtual viewpoint in the virtual watching scene, where the spatial coordinates corresponding to the current audience account are located within a current field of view after the switching.

In some embodiments, after the determining, based on a current field of view of a virtual viewpoint in the virtual watching scene and the spatial coordinates, a target comment located within the current field of view, the apparatus further includes:

a priority determining module, configured to determine a first display priority of the target comment when that a comment quantity of the target comment is greater than a first threshold, where the first display priority is related to an audience account issuing the target comment and issuing time of the target comment; and a screening module, configured to screen the target comment according to the first display priority to obtain a screened target comment, where a comment quantity of the screened target comment is less than or equal to the threshold; and the display module 1501 is configured to:

display the screened target comment presenting the display effect at the display position in the video comment region.

In some embodiments, the display module 1501 is configured to:

display, when that the same display position corresponds to one comment, the comment within display duration corresponding to the comment;

determine, when that the same display position corresponds to at least two comments, a second display priority corresponding to each of the at least two comments, where the second display priority is related to an audience account issuing the comment and issuing time of the comment; and display the at least two comments in sequence according to the second display priority and display duration corresponding to each of the at least two comments.

In some embodiments, the determining module 1503 is configured to display a spatial position selection control, where the spatial position selection control is configured for selecting the spatial coordinates corresponding to the current audience account; and determine, in response to a trigger operation on the spatial position selection control, the spatial coordinates corresponding to the current audience account according to the trigger operation; or the obtaining module 1502 is configured to obtain, when that the comment issuing operation is received and spatial coordinates are not allocated to the current audience account, spatial coordinates allocated by a server to the current audience account; or the obtaining module 1502 is further configured to obtain, when of first entering the video playing interface, spatial coordinates allocated by a server to the current audience account.

Figure 16:
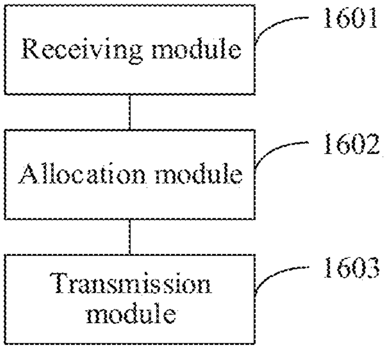
FIG. 16 is a structural block diagram of a video comment display apparatus according to another exemplary embodiment of this application.

FIG. 16 is a structural block diagram of a video comment display apparatus according to another exemplary embodiment of this application. The apparatus includes:

- a receiving module 1601, configured to receive a comment issued by an audience account, where the comment is targeted for a video played in a video playing region in a video playing interface;
- an allocation module 1602, configured to perform spatial position allocation on the audience account to obtain spatial coordinates corresponding to the audience account, where the spatial coordinates are configured for indicating a spatial position at which the audience account is located in a virtual watching scene corresponding to the video; and
- a transmission module 1603, configured to transmit the comment and the spatial coordinates to the audience account, to cause an audience terminal corresponding to the audience account to determine a comment display attribute of the comment based on the spatial coordinates and display the comment in a video comment region in the video playing interface based on the comment display attribute, where the comment display attribute includes a display position and a display effect of the comment in the video comment region.

Based on the above, in the embodiments of this application, the terminal displays the video and the video comment in the video playing interface in different regions, and divides the video playing interface into the video playing region and the video comment region. In addition, to simulate the three-dimensional sense of users located at different positions watching performance in a real watching scene, the terminal transmits the comment issued by the audience account to the server, and the server performs spatial position allocation on the audience account, so that the terminal obtains the comment issued by the audience account and the spatial coordinates corresponding to the audience account from the server, where the spatial coordinates indicate the spatial position at which the audience account is located in the virtual watching scene corresponding to the video. Further, the terminal determines the comment display attribute of the comment in the video comment region based on the spatial coordinates, and displays the comment at the corresponding display position based on the display effect corresponding to the comment, thereby improving the three-dimensional sense of comment displaying in the video comment region and improving the diversity of the display effect of the comment.

The apparatus provided in the foregoing embodiments is illustrated with an example of division of the foregoing functional modules. During actual application, the functions may be allocated to and completed by different functional modules according to a requirement, that is, the internal structure of the apparatus is divided into different functional modules, to complete all or some of the functions described above. In addition, the apparatuses provided in the foregoing embodiments and the method embodiments fall within the same conception. For details of a specific implementation process, reference may be made to the method embodiments. Details are not described herein again.

Figure 17:
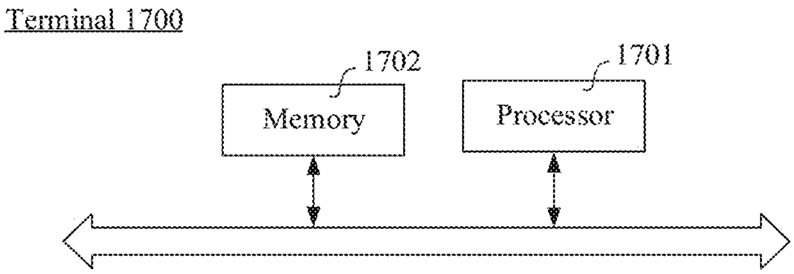
FIG. 17 is a structural block diagram of a terminal according to an exemplary embodiment of this application.

FIG. 17 is a structural block diagram of a terminal 1700 according to an exemplary embodiment of this application. The terminal 1700 may be a portable mobile terminal such as a smartphone, a tablet computer, an MP3 player, or an MP4 player. The terminal 1700 may also be referred to as another name such as user equipment or a portable terminal.

Generally, the terminal 1700 includes: a processor 1701 and a memory 1702.

The processor 1701 may include one or more processing cores, and may be, for example, a 4-core processor or an 8-core processor. The processor 1701 may be implemented by using at least one hardware form of a digital signal processor (DSP), a field-programmable gate array (FPGA), or a programmable logic array (PLA). The processor 1701 may also include a main processor and a coprocessor. The main processor is a processor configured to process data in an awake state, also referred to as a central processing unit (CPU). The coprocessor is a low power consumption processor configured to process data in a standby state. In some embodiments, the processor 1701 may be integrated with a graphics processing unit (GPU). The GPU is configured to render and draw content that needs to be displayed on a display screen. In some embodiments, the processor 1701 may further include an artificial intelligence (AI) processor. The AI processor is configured to process computing operations related to machine learning.

The memory 1702 may include one or more non-transitory computer-readable storage media. The computer-readable storage medium may be tangible and non-transitory. The memory 1702 may further include a high-speed random access memory and a non-volatile memory, for example, one or more magnetic disk storage devices or flash storage devices. In some embodiments, the non-transitory computer-readable storage medium in the memory 1702 is configured to store at least one instruction, and the at least one instruction is executed by the processor 1701 to implement the video comment display method provided in the embodiments of this application.

A person skilled in the art may understand that the structure shown in FIG. 17 constitutes no limitation on the terminal 1700, and the terminal may include more or fewer components than those shown in the figure, or some components may be combined, or a different component deployment may be used.

Figure 18:
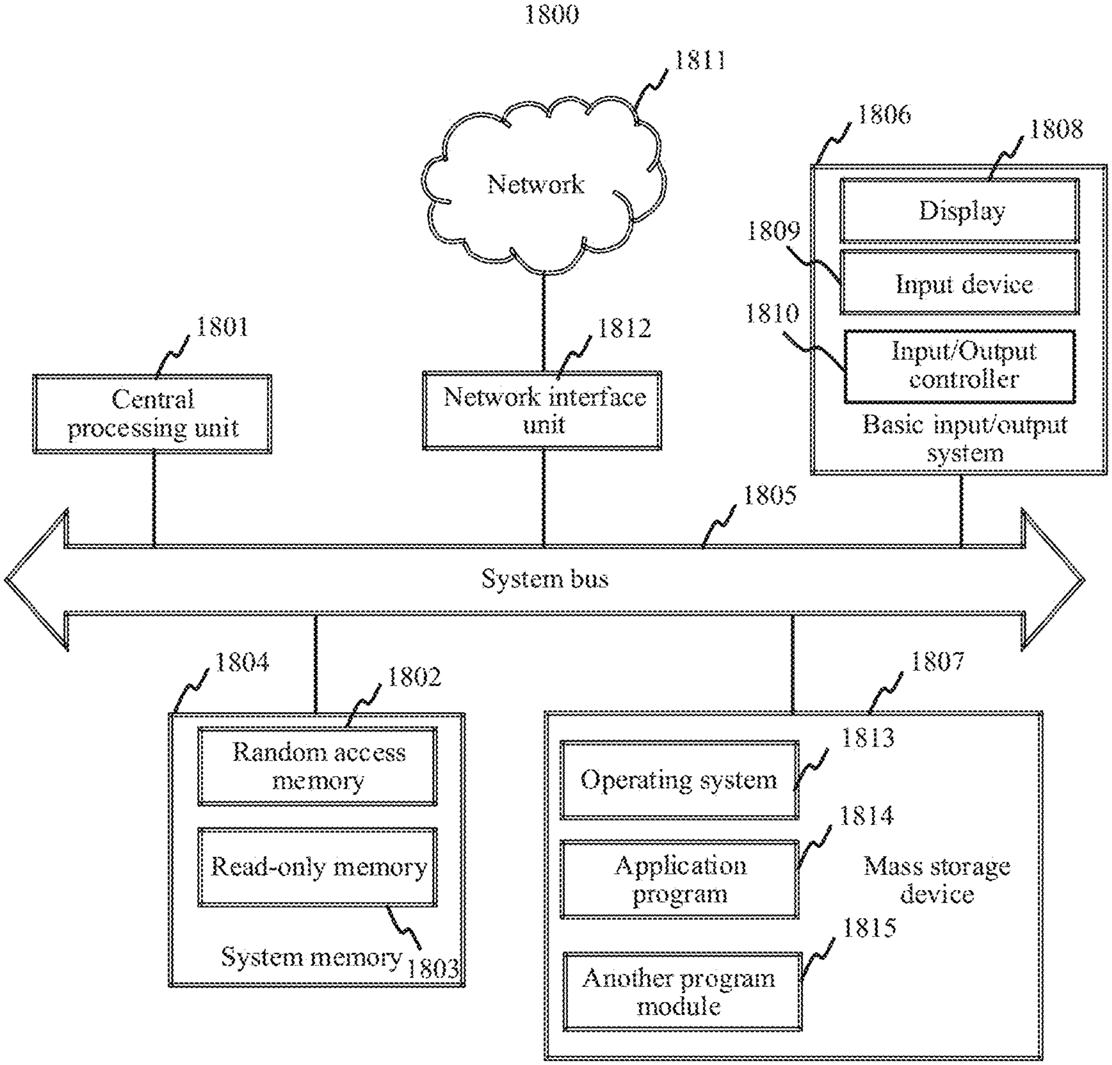
FIG. 18 is a schematic structural diagram of a server according to an exemplary embodiment of this application.

FIG. 18 is a schematic structural diagram of a server according to an exemplary embodiment of this application. The server 1800 may be implemented as the terminal or the server in the foregoing embodiments. Specifically, the server 1800 includes a central processing unit (CPU) 1801, a system memory 1804 including a random access memory 1802 and a read-only memory 1803, and a system bus 1805 connecting the system memory 1804 and the central processing unit 1801. The server 1800 further includes a basic input/output system (I/O system) 1806 for transmitting information between components in a computer, and a mass storage device 1807 configured to store an operating system 1813, an application program 1814, and another program module 1815.

The basic input/output system 1806 includes a display 1808 configured to display information and an input device 1809 such as a mouse and a keyboard used by a user to input information. The display 1808 and the input device 1809 are both connected to the central processing unit 1801 through an input/output controller 1810 connected to the system bus 1805. The basic input/output system 1806 may further include the input/output controller 1810 for receiving and processing input from a plurality of other devices such as a keyboard, a mouse, an electronic stylus, or the like. Similarly, the input/output controller 1810 further provides output to a display screen, a printer, or other types of output devices.

The mass storage device 1807 is connected to the central processing unit 1801 through a mass storage controller (not shown) connected to the system bus 1805. The mass storage device 1807 and an associated computer-readable medium provide non-volatile storage for the server 1800. That is, the mass storage device 1807 may include a computer-readable medium (not shown) such as a hard disk or a drive.

In general, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a random access memory (RAM), a read-only memory (ROM), a flash memory or another solid-state storage technology, a compact disc read-only memory (CD-ROM), a digital video disc (DVD) or another optical storage, a magnetic cassette, a magnetic tape, or a magnetic disk storage or another magnetic storage device. Certainly, a person skilled in the art may learn that the computer storage medium is not limited to the above. The foregoing system memory 1804 and the mass storage device 1807 may be collectively referred to as a memory.

The memory stores one or more programs, and the one or more programs are configured to be executed by one or more central processing units 1801. The one or more programs include instructions configured for implementing the foregoing method, and the central processing unit 1801 executes the one or more programs to implement the method provided in the foregoing method embodiments.

According to various embodiments of this application, the server 1800 may further be connected, by using a network such as the Internet, to a remote computer on the network and run. That is, the server 1800 may be connected to a network 1812 by using a network interface unit 1811 connected to the system bus 1805, or may be connected to another type of network or a remote computer system (not shown) by using the network interface unit 1811.

An embodiment of this application further provides a computer-readable storage medium. The readable storage medium stores at least one instruction, and at least one instruction is loaded and executed by a processor, to implement the video comment display method provided in the foregoing method embodiments.

In some embodiments, the computer-readable storage medium may include: a ROM, a RAM, a solid state drive (SSD), an optical disc, or the like. The RAM may include a resistance random access memory (ReRAM) and a dynamic random access memory (DRAM).

An embodiment of this application provides a computer program product, including computer instructions, the computer instructions being stored in a computer-readable storage medium. A processor of a computer device reads the computer instructions from the computer-readable storage medium, and executes the computer instructions, to cause the computer device to perform the video comment display method according to the foregoing embodiments.

A person of ordinary skill in the art may understand that all or part of the operations of implementing the foregoing embodiments may be implemented by hardware, or may be implemented by a program instructing related hardware. The program may be stored in a computer-readable storage medium. The storage medium mentioned may be a read-only memory, a magnetic disk, or an optical disc.

The foregoing merely describes embodiments of this application, but are not intended to limit this application. Any modification, equivalent replacement, or improvement made within the spirit and principle of this application shall fall within the protection scope of this application.

What is claimed is:

1. A video comment display method, performed by a computer device, the method comprising:

displaying a video playing interface, the video playing interface comprising a video playing region and a video comment region, and the video comment region being configured for displaying comments for a video in the video playing region;

obtaining a comment issued by an audience account associated with the computer device;

determining viewpoint coordinates of a virtual viewpoint of the audience account facing a spatial position of a 3D virtual watching scene at which the comment is posted;

determining a target position for the comment in the 3D virtual watching scene based on the viewpoint coordinates of the virtual viewpoint of the audience account, wherein the target position is located within a current field of view of the virtual viewpoint of the audience account;

determining a display position in the video comment region corresponding to the target position for the comment; and displaying the comment at the display position in the video comment region.

2. The method according to claim 1, wherein the determining the target position for the comment in the 3D virtual watching scene based on the viewpoint coordinates of the virtual viewpoint of the audience account comprises:

determining a display effect of the comment based on a distance between the viewpoint coordinates of the virtual viewpoint of the audience account in the 3D virtual watching scene and spatial coordinates of the spatial position in the 3D virtual watching scene at which the comment is posted, wherein the display effect comprises a display size and display transparency, the display size is negatively correlated with the distance, and the display transparency is positively correlated with the distance.

3. The method according to claim 1, wherein the determining the target position for the comment in the 3D virtual watching scene based on the viewpoint coordinates of the virtual viewpoint of the audience account comprises:

determining relative coordinates of the viewpoint coordinates of the virtual viewpoint of the audience account in the 3D virtual watching scene and spatial coordinates of the spatial position in the 3D virtual watching scene at which the comment is posted; and searching a display attribute table for the target position of the comment based on the relative coordinates, wherein the display attribute table comprises a correspondence between different relative coordinate ranges and comment target positions.

4. The method according to claim 1, wherein the method further comprises:

switching the current field of view of the virtual viewpoint in the 3D virtual watching scene in response to a field of view switching operation issued by the audience account within the video comment region.

5. The method according to claim 1, wherein the displaying the comment at the display position in the video comment region comprises:

displaying, when that the display position corresponds to one comment, the comment within display duration corresponding to the comment;

determining, when that the display position corresponds to at least two comments, a second display priority corresponding to each of the at least two comments, wherein the second display priority is related to an audience account issuing the comment and issuing time of the comment; and displaying the at least two comments in sequence according to the second display priority and display duration corresponding to each of the at least two comments.

6. The method according to claim 1, wherein the method further comprises:

displaying a spatial position selection control in the video comment region;

determining, in response to a trigger operation on the spatial position selection control, the spatial coordinates corresponding to the audience account according to the trigger operation.

7. A computer device, comprising a processor and a memory, the memory storing at least one instruction, and the at least one instruction, when loaded and executed by the processor, causing the computer device to implement a video comment display method including:

displaying a video playing interface, the video playing interface comprising a video playing region and a video comment region, and the video comment region being configured for displaying comments for a video in the video playing region;

obtaining a comment issued by an audience account associated with the computer device;

determining viewpoint coordinates of a virtual viewpoint of the audience account facing a spatial position of a 3D virtual watching scene at which the comment is posted;

determining a target position for the comment in the 3D virtual watching scene based on the viewpoint coordinates of the virtual viewpoint of the audience account, wherein the target position is located within a current field of view of the virtual viewpoint of the audience account;

determining a display position in the video comment region corresponding to the target position for the comment; and displaying the comment at the display position in the video comment region.

8. The computer device according to claim 7, wherein the determining the target position for the comment in the 3D virtual watching scene based on the viewpoint coordinates of the virtual viewpoint of the audience account comprises:

determining a display effect of the comment based on a distance between the viewpoint coordinates of the virtual viewpoint of the audience account in the 3D virtual watching scene and spatial coordinates of the spatial position in the 3D virtual watching scene at which the comment is posted, wherein the display effect comprises a display size and display transparency, the display size is negatively correlated with the distance, and the display transparency is positively correlated with the distance.

9. The computer device according to claim 7, wherein the determining the target position for the comment in the 3D virtual watching scene based on the viewpoint coordinates of the virtual viewpoint of the audience account comprises:

determining relative coordinates of the viewpoint coordinates of the virtual viewpoint of the audience account in the 3D virtual watching scene and spatial coordinates of the spatial position in the 3D virtual watching scene at which the comment is posted; and searching a display attribute table for the target position of the comment based on the relative coordinates, wherein the display attribute table comprises a correspondence between different relative coordinate ranges and comment target positions.

10. The computer device according to claim 7, wherein the method further comprises:

switching the current field of view of the virtual viewpoint in the 3D virtual watching scene in response to a field of view switching operation issued by the audience account within the video comment region.

11. The computer device according to claim 7, wherein the displaying the comment at the display position in the video comment region comprises:

displaying, when that the display position corresponds to one comment, the comment within display duration corresponding to the comment;

determining, when that the display position corresponds to at least two comments, a second display priority corresponding to each of the at least two comments, wherein the second display priority is related to an audience account issuing the comment and issuing time of the comment; and displaying the at least two comments in sequence according to the second display priority and display duration corresponding to each of the at least two comments.

12. The computer device according to claim 7, wherein the method further comprises:

displaying a spatial position selection control in the video comment region;

determining, in response to a trigger operation on the spatial position selection control, the spatial coordinates corresponding to the audience account according to the trigger operation.

13. A non-transitory computer-readable storage medium, having at least one instruction stored therein, and the at least one instruction, when loaded and executed by a processor of a computer device, causing the computer device to implement a video comment display method including:

displaying a video playing interface, the video playing interface comprising a video playing region and a video comment region, and the video comment region being configured for displaying comments for a video in the video playing region;

obtaining a comment issued by an audience account associated with the computer device;

determining viewpoint coordinates of a virtual viewpoint of the audience account facing a spatial position of a 3D virtual watching scene at which the comment is posted;

determining a target position for the comment in the 3D virtual watching scene based on the viewpoint coordinates of the virtual viewpoint of the audience account, wherein the target position is located within a current field of view of the virtual viewpoint of the audience account;

determining a display position in the video comment region corresponding to the target position for the comment; and displaying the comment at the display position in the video comment region.

14. The non-transitory computer-readable storage medium according to claim 13, wherein the method further comprises:

displaying a spatial position selection control in the video comment region;

determining, in response to a trigger operation on the spatial position selection control, the spatial coordinates corresponding to the audience account according to the trigger operation.

15. The non-transitory computer-readable storage medium according to claim 13, wherein the determining the target position for the comment in the 3D virtual watching scene based on the viewpoint coordinates of the virtual viewpoint of the audience account comprises:

determining a display effect of the comment based on a distance between the viewpoint coordinates of the virtual viewpoint of the audience account in the 3D virtual watching scene and spatial coordinates of the spatial position in the 3D virtual watching scene at which the comment is posted, wherein the display effect comprises a display size and display transparency, the display size is negatively correlated with the distance, and the display transparency is positively correlated with the distance.

16. The non-transitory computer-readable storage medium according to claim 13, wherein the determining the target position for the comment in the 3D virtual watching scene based on the viewpoint coordinates of the virtual viewpoint of the audience account comprises:

determining relative coordinates of the viewpoint coordinates of the virtual viewpoint of the audience account in the 3D virtual watching scene and spatial coordinates of the spatial position in the 3D virtual watching scene at which the comment is posted; and searching a display attribute table for the target position of the comment based on the relative coordinates, wherein the display attribute table comprises a correspondence between different relative coordinate ranges and comment target positions.

17. The non-transitory computer-readable storage medium according to claim 13, wherein the method further comprises:

switching the current field of view of the virtual viewpoint in the 3D virtual watching scene in response to a field of view switching operation issued by the audience account within the video comment region.

18. The non-transitory computer-readable storage medium according to claim 13, wherein the displaying the comment at the display position in the video comment region comprises:

displaying, when that the display position corresponds to one comment, the comment within display duration corresponding to the comment;

determining, when that the display position corresponds to at least two comments, a second display priority corresponding to each of the at least two comments, wherein the second display priority is related to an audience account issuing the comment and issuing time of the comment; and displaying the at least two comments in sequence according to the second display priority and display duration corresponding to each of the at least two comments.

* * * * *